(12) United States Patent
Poole et al.

(10) Patent No.: US 10,288,753 B2
(45) Date of Patent: May 14, 2019

(54) METHOD FOR DESIGNATURE OF SEISMIC DATA ACQUIRED USING MOVING SOURCE

(71) Applicant: CGG SERVICES SA, Massy (FR)

(72) Inventors: Gordon Poole, East Grinstead (GB); Robert Dowle, Massy (FR)

(73) Assignee: CGG SERVICES SAS, Massy (FR)

( * ) Notice: Subject to any disclaimer, the term of this patent is extended or adjusted under 35 U.S.C. 154(b) by 266 days.

(21) Appl. No.: 14/902,619

(22) PCT Filed: Jul. 22, 2014

(86) PCT No.: PCT/EP2014/065760
§ 371 (c)(1),
(2) Date: Jan. 4, 2016

(87) PCT Pub. No.: WO2015/011160
PCT Pub. Date: Jan. 29, 2015

(65) Prior Publication Data
US 2016/0187513 A1 Jun. 30, 2016

Related U.S. Application Data

(60) Provisional application No. 61/857,262, filed on Jul. 23, 2013, provisional application No. 61/888,628, (Continued)

(51) Int. Cl.
*G06F 19/00* (2018.01)
*G01V 1/00* (2006.01)
(Continued)

(52) U.S. Cl.
CPC ............... *G01V 1/362* (2013.01); *G01V 1/38* (2013.01); *G01V 2210/1293* (2013.01); *G01V 2210/1423* (2013.01); *G01V 2210/47* (2013.01)

(58) Field of Classification Search
None
See application file for complete search history.

(56) References Cited

U.S. PATENT DOCUMENTS 3,794,827 A * 2/1974 Widess .................... G01V 1/28
367/52
4,168,485 A 9/1979 Payton et al.
(Continued)

FOREIGN PATENT DOCUMENTS

EP  2 594 962 A2  5/2013
WO  2014/177522 A2  11/2014

OTHER PUBLICATIONS

International Search Report dated Dec. 3, 2014 in related application No. PCT/EP2014/065760.
(Continued)

*Primary Examiner* — Calvin Y Choi
(74) *Attorney, Agent, or Firm* — Patent Portfolio Builders PLLC

(57) ABSTRACT

Methods of compensating for source signature effects in seismic data are described. One method includes a step of receiving seismic data recorded with a receiver; a step of receiving source data of the seismic waves generated by the moving source; a step of receiving position data of the source while generating the seismic waves; a step of determining a transform operator using the source data, the position data, and a selected domain-transform operator; a step of determining a seismic model by mathematically optimizing a relationship between the transform and the seismic data; and a step of compensating for the source signature effects in the seismic data using the seismic model. A method for generating an image of a subsurface of a geographical area using seismic data includes compensating
(Continued)

the seismic data for source signature effects using a model which assumes a moving, non-impulsive source.

21 Claims, 22 Drawing Sheets

Related U.S. Application Data filed on Oct. 9, 2013, provisional application No. 61/921,711, filed on Dec. 30, 2013.

(51) Int. Cl.
  G01V 1/28 (2006.01)
  G01V 1/36 (2006.01)
  G01V 1/38 (2006.01)

(56) References Cited

U.S. PATENT DOCUMENTS

| | | | |
|---|---|---|---|
| 4,809,235 A | 2/1989 | Dragoset, Jr. | |
| 6,151,556 A | 11/2000 | Allen | |
| 6,807,508 B2 | 10/2004 | Bacquey | |
| 7,859,945 B2 | 12/2010 | Sallas et al. | |
| 8,582,395 B2 | 11/2013 | Ferber | |
| 8,619,497 B1 | 12/2013 | Sallas et al. | |
| 2009/0248313 A1* | 10/2009 | Berkovitch | G01V 1/28 702/16 |
| 2012/0113747 A1 | 5/2012 | Ferber | |
| 2013/0176819 A1 | 7/2013 | Poole | |
| 2013/0286773 A1* | 10/2013 | Haumonte | G01V 1/3808 367/16 |
| 2014/0043936 A1 | 2/2014 | Poole | |

OTHER PUBLICATIONS

Written Opinion dated Dec. 3, 2014 in related application No. PCT/EP2014/065760.

Gary Hampson et al., "The Effects of Source and Receiver Motion on Seismic Data", Geophysical Prospecting, 43, Feb. 1995, pp. 221-244.

Dan Hampson, "Inverse Velocity Stacking for Multiple Elimination" Journal of the Canadian Society of Exploration Geophysicists, vol. 28., No. 1, Dec. 1986, pp. 44-56.

Gary Hampson et al., "Effects of Source and Receiver Motion on Seismic Data", SEG, Jan. 1990: pp. 859-862.

Daniel Trad et al., "Latest Views of the sparse Radon Transform", Geophysics, vol. 68, No. 1, Jan.-Feb. 2007, pp. 286-399.

C.A. Van Der Schans et al., "Angular-Dependent Signature Deconvolution", University of Technology, Netherlands, SEG Technical Program Expanded Abstracts 1983: pp. 433-435.

A. Ziolkowski et al., The Signature of an Air Gun Array: Computation From Near-Field Measurements Including Interactions, Geophysics, vol. 47, No. 10, Oct. 1982 pp. 1413-1421.

European Office Action, dated Feb. 22, 2019, for related European Application No. 14744512.6. (All references cited are already of record.).

* cited by examiner

Fig. 1A
Fig. 1B
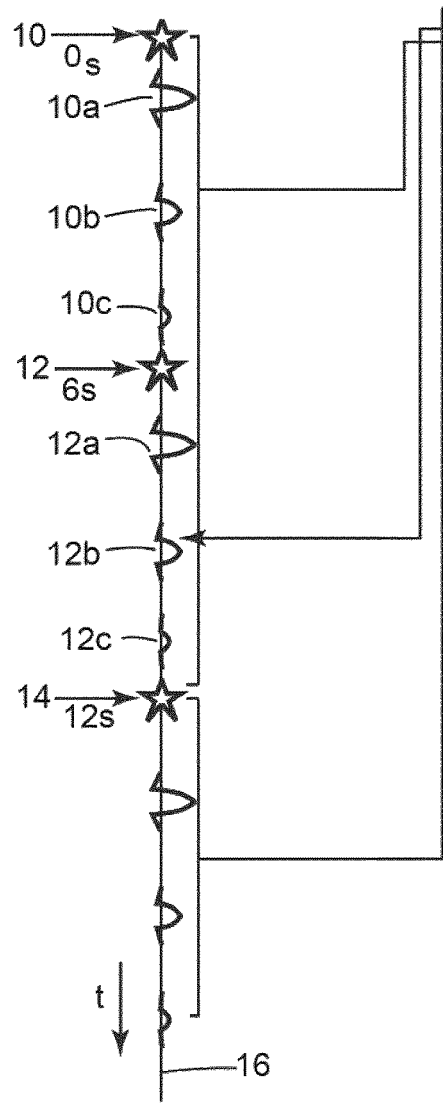
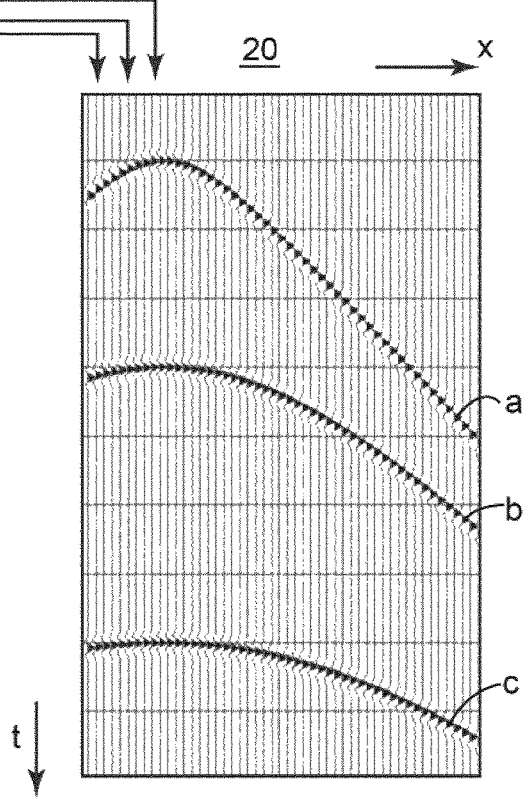

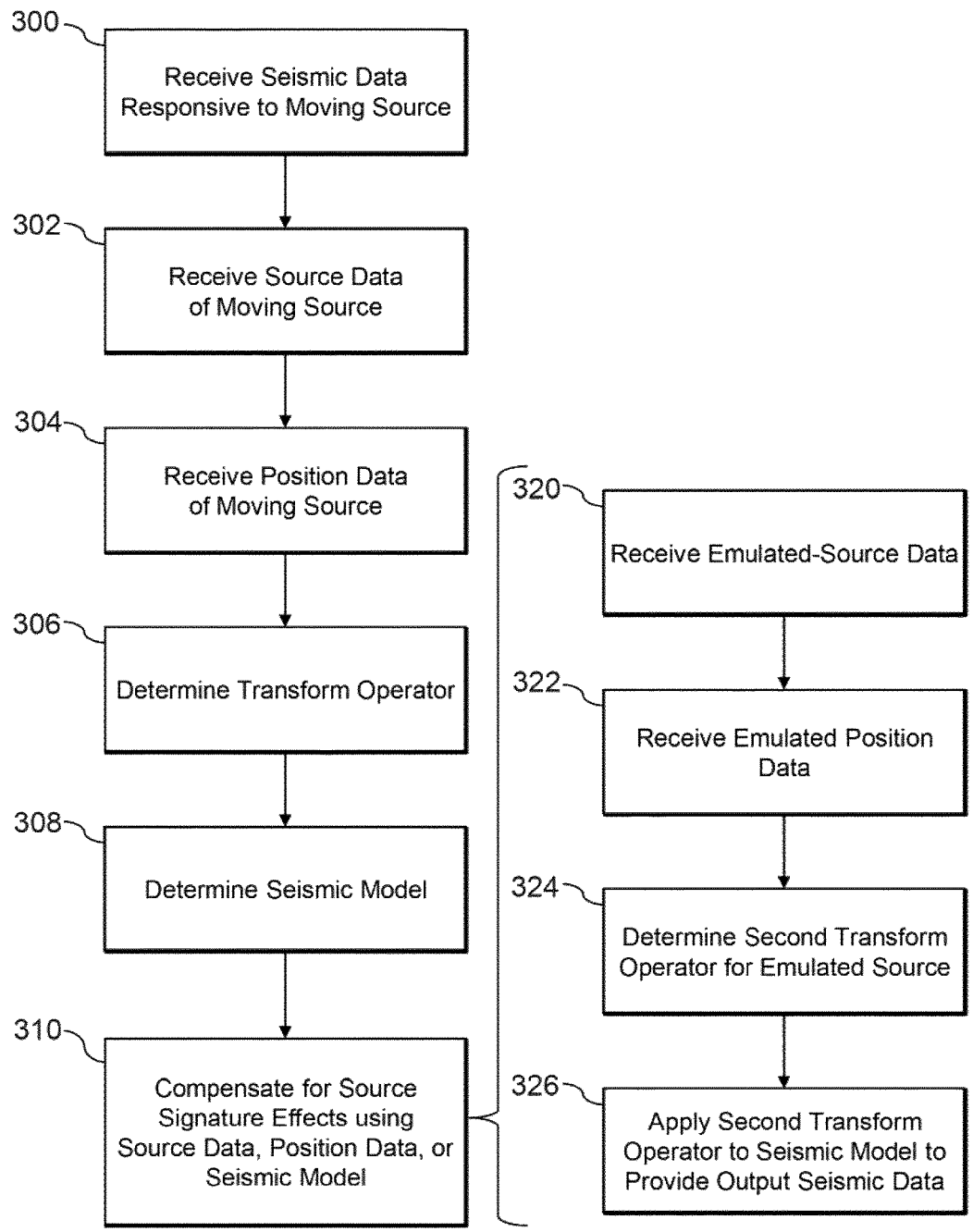

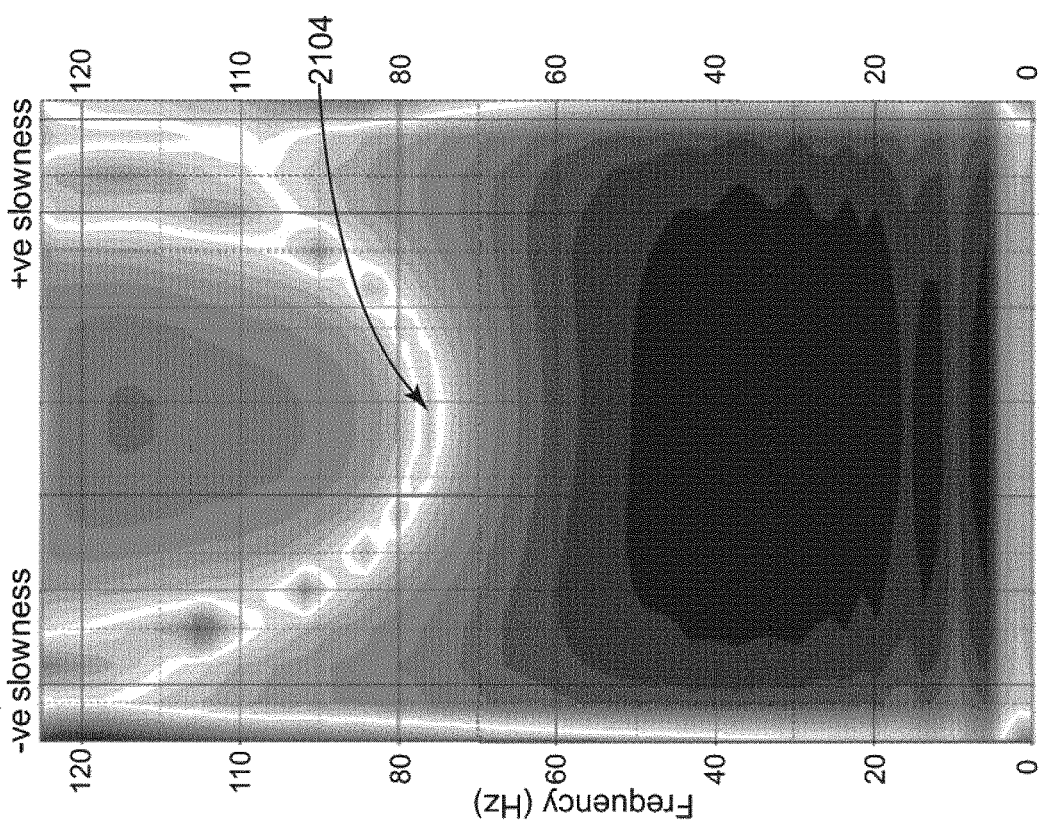
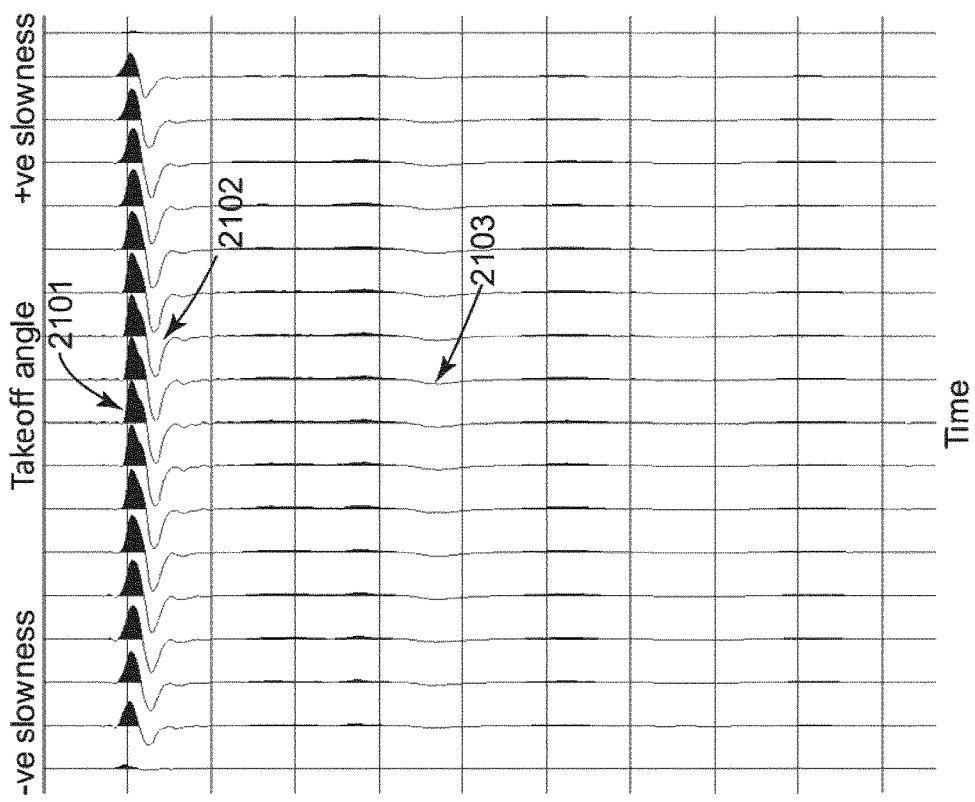

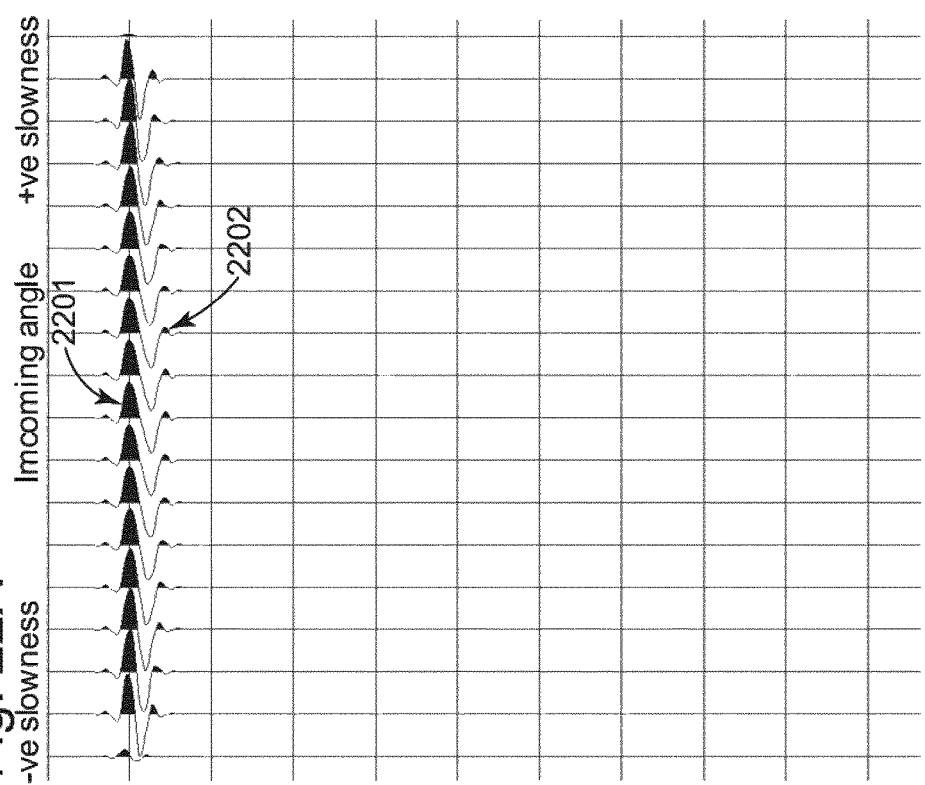
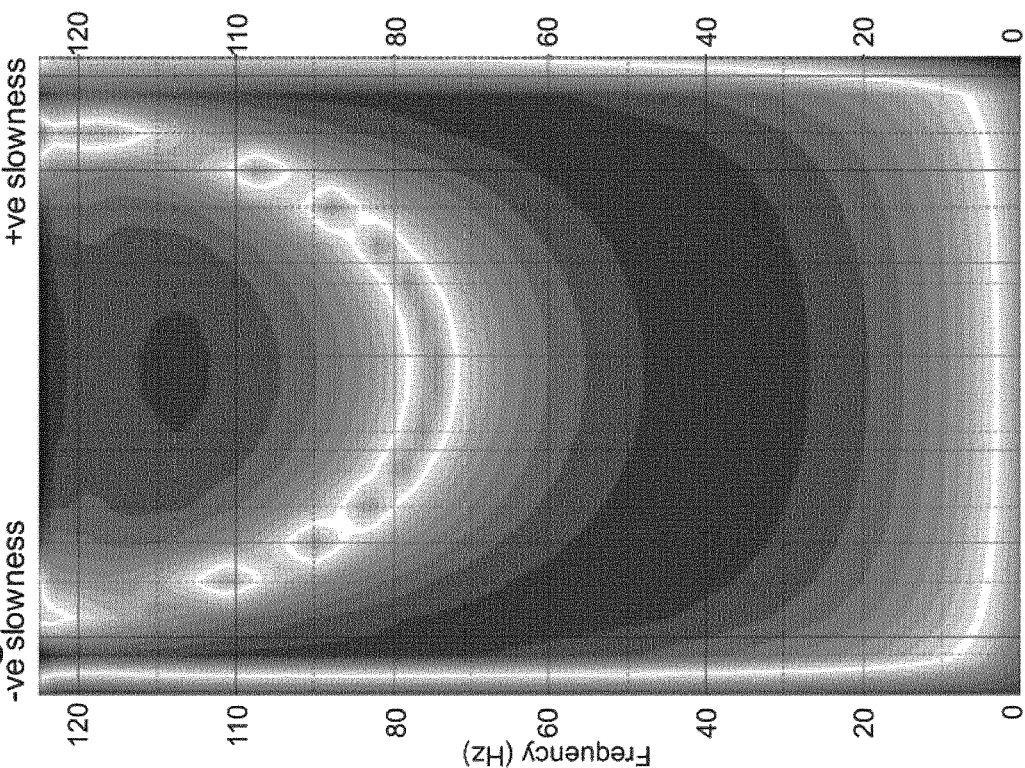

METHOD FOR DESIGNATURE OF SEISMIC DATA ACQUIRED USING MOVING SOURCE

PRIORITY INFORMATION

The present application claims priority under 35 U.S.C. § 119(e) to U.S. Provisional Patent Application Ser. No. 61/857,262, filed Jul. 23, 2013, the entire contents of which are expressly incorporated herein by reference. The present application also claims priority under 35 U.S.C. § 119(e) to U.S. Provisional Patent Application Ser. No. 61/888,628, filed Oct. 9, 2013, the entire contents of which are expressly incorporated herein by reference. The present application also claims priority under 35 U.S.C. § 119(e) to U.S. Provisional Patent Application Ser. No. 61/921,711, filed Dec. 30, 2013 the entire contents of which are expressly incorporated herein by reference.

TECHNICAL FIELD

Embodiments of the subject matter disclosed herein generally relate to methods and systems for generating, acquiring and processing seismic data and, more particularly, to mechanisms and techniques for processing recorded seismic data generated by moving seismic sources.

DISCUSSION OF THE BACKGROUND

Seismic data acquisition and processing may be used to generate a profile (image) of geophysical structures under the ground (subsurface). While this profile does not necessarily provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

Seismic data acquisition generally employs multiple impulsive sources (e.g., explosive or airgun sources) or continuous sources (e.g., "vibroseis" vibratory sources) that release seismic energy when triggered. These or other seismic sources are positioned with respect to geophone or hydrophone receivers and then activated. Once activated, impulsive sources produce a generally short, sharp shock, and vibrators generate a sweep that typically lasts between five and twenty seconds and typically spans a predetermined range of frequencies. A recording system records the response data measured at the receivers. For reflection seismology, the record length is typically set to equal the sweep length plus a listen time equal to the two-way travel time, which is the time required for the seismic energy to propagate from the source through the Earth to the deepest reflector of interest and back to the receiver. The sources are then moved to a new source location and the process is repeated. As used herein, the term "shot" refers to the energy produced by a seismic source when activated (whether impulsive or vibratory); the terms "shoot" and "fire" refer to the activation of a seismic source. Conventional data-analysis techniques often process data collected by assuming a stationary receiver after firing a stationary source (or a source which can be considered to be, from a data processing perspective, stationary (for example, an ocean bottom survey using fixed receivers)) as described below. An example of such techniques is Wiener (least-squares) filtering, which is used to compensate for known sources of error or contamination in the recorded data, such as a non-ideal source waveform.

During a seismic survey, the measurable response D(t) (the signal recorded with a seismic sensor) is considered to be composed of the impulse response of the Earth G(t) convolved with the Earth attenuation E(t) and the farfield waveform P(t) of the seismic source, plus some noise N(t). In 1D this can be expressed as a convolution ("*") in the time domain:

$$D(t)=[P(t)*G(t)*E(t)]+N(t) \qquad (1)$$

An initial seismic data processing step attempts to recover the Earth impulse response G(t) from the measurable quantity D(t). To achieve this, the shape of the far-field waveform P(t) is measured or otherwise determined and used in Equation (1). In practice this involves convolving the inverse of P(t) with D(t). The farfield waveform P(t) may be a few hundred milli-seconds to several seconds in length.

In conventional marine seismic acquisition, a vessel tows plural streamers having multiple seismic receivers configured to record seismic data. The vessel also tows a seismic source, e.g., an airgun, which imparts seismic energy into the water. The seismic energy travels toward the subsurface and is partially reflected back towards the sea surface. The seismic recorders record the reflected seismic waves. The vessel generally moves at a constant speed and shoots at regular time intervals. Shooting while in motion significantly increases the amount of data that can be collected in a given amount of time, since it does not require time to accelerate and decelerate between shots. Conventional analysis techniques used for seismic data collected from stationary sources can, in general, still be used for marine airgun data. This is because the airgun is an impulsive source and the water exerts drag on the bubble produced in the water by the airgun, effectively making that bubble stationary until the energy from a given shot has dissipated.

However, there is a need for more flexibility in selecting source waveforms and other seismic-source characteristics. For example, environmental regulations may restrict the use of impulsive sources in some jurisdictions. Under such regulations, it may be preferable to use vibratory sources instead of synchronized airgun arrays. However, with regards to marine operation, keeping stationary while shooting a vibratory source can be very difficult. Moreover, the time to bring the vessel up to speed, navigate to the next shot point, and decelerate to station-keeping would dramatically reduce the amount of data collected per day of marine operation. The alternative is to operate the vibratory source while the vessel is in motion. Accordingly, there is a need for techniques for processing seismic data from non-impulsive, moving sources, which conventional techniques cannot do.

FIGS. 1A-2B show examples of a difficulty encountered in continuous-data processing by contrast with impulsive-source processing. When an impulsive source is fired with standard data acquisition, the subsequent recording time is selected so that substantially all useful reflected/diffracted energy is recorded before the next shot fires. This delay time imposes constraints on the acquisition rate and, hence, increases the cost of acquisition.

In this regard, FIG. 1A shows sources being actuated at different spatial positions 10, 12 and 14 with delay time such that the recorded wavelets 10a-c corresponding to spatial position 10 do not interfere (in time) with wavelets 12a-c corresponding to spatial position 12. The signal recorded at the receiver (e.g., a stationary receiver) can be considered as a continuous recording (16) or separated to form regular seismic traces for each individual shot as shown in FIG. 1B. The traces as illustrated in FIG. 1B form a receiver gather 20. Each vertical trace in the receiver gather 20 relates to a different shot and has a different position on axis X, and each wavelet has a different time on a temporal axis t. FIGS. 1A and 1B can respectively represent, for example, multiple shots being fired by a seismic-survey vessel as it sails, and the data collected by a stationary receiver such as an ocean-bottom node (OBN).

To reduce the acquisition time, it is possible to simultaneously shoot two or more sources. Acquisition of simultaneous source data means that the signals from those sources interfere at least for part of the record. By acquiring data in this way, the time taken to shoot a dataset is reduced along with the acquisition costs. As an alternative to reducing the acquisition time, a higher density dataset may be acquired in the same time. For such data to be useful, it is necessary to develop processing algorithms to handle source interference (cross-talk noise). Such algorithms permit determining which of the observed subsurface reflections is associated with each source. This is referred to as "deblending" the data.

FIG. 2A shows a source configuration similar to that of FIG. 1A, but with the sources simultaneously activated so that, for example, the wavelet 10c is superposed (in time) with the wavelet 12a. FIG. 2B shows the receiver gather 30 formed though pseudo-deblending. Pseudo-deblending involves forming regular seismic traces from the continuous recording based on the start time of the actuation of each shot with no attempt to mitigate cross-talk noise. The data of FIG. 2B has been shot in less time than the data in FIG. 1B, but cross-talk 32 is observed and noise on one trace is signal on another trace.

A continuous source is the limit of a series of shots as the time between shots approaches zero. Accordingly, the noise and cross-talk 32 visible in FIG. 2B are representative of the type of effects that must be compensated for in order to effectively use data from continuous sources. Present "designature" techniques for processing continuous-source data, e.g., for vibroseis sources, require the source to be stationary while operating. Accordingly, there is a need for ways of processing data that will permit continuous sources to be used while moving, e.g., during marine operations.

Moreover, as the source changes position with respect to the Earth, variations in the angle of subsurface features with respect to the incident seismic energy can change the angle of reflection of that energy. When the source takeoff angle and the receiver incoming angle differ relative to the respective directions of motion of the source and the receiver, the seismic signal will undergo a Doppler shift, and the receiver will detect a frequency different from the frequency emitted by the source. Various techniques have been described for compensating for error introduced by Doppler shifts, e.g., U.S. Pat. No. 4,809,235 to Dragoset, Jr., and U.S. Pat. No. 6,151,556 to Allen, each of which is incorporated herein by reference. However, various of these techniques are limited to frequency-sweep source emissions. Accordingly, there is a need for a way of compensating for Doppler shift while still permitting various types of source signals to be used.

For completeness, reference is made to the following papers: "Effects of Source and Receiver Motion on Seismic Data," Gary Hampson and Helmut Jakubowicz (Texaco Ltd., England), 1990 *SEG*, pp. 859-862; "The Effects of Source and Receiver Motion on Seismic Data," Gary Hampson and Helmut Jakubowicz, *Geophysical Prospecting*, 1995, 43, 221-224; Hampson, D. 1986, "Inverse velocity stacking for multiple elimination," *Journal of Canadian Society of Exploration Geophysics*, 22, 1, 44-55; Hubbard, T. P., Sugrue, M. J., Sandham, W. A., and Booth, E. A., 1984. "Marine source and receiver deghosting and array inversion in F-K space," *46th EAEG Meeting, Abstracts*, p 26; Trad, D., Ulrych, T. and Sacchi, M. 2003, "Latest views of the sparse Radon transform," *Geophysics*, Vol. 68, no 1, pg. 386-399; Van der Schans, C. A. and Ziolkowski, A. M., 1983, "Angular-Dependent Signature Deconvolution," *SEG conference proceedings*, pages 433-435; and Ziolkowski, A., Parkes, G. E., Hatton, L. and Haugland, T., 1982, "The signature of an airgun array: computation from near-field measurements including interactions," *Geophysics* 47, 1413-1421. However, these papers do not satisfy the aforedescribed needs which are present in today's seismic data processing techniques.

SUMMARY

According to an embodiment, a method for generating an image of a subsurface of a geographical area using seismic data includes the steps of generating the image by compensating the seismic data for source signature effects using a model which assumes that a source used to generate seismic waves associated with the seismic data is a moving, non-impulsive source.

According to another embodiment, a seismic data processing system includes at least one processor configured to receive seismic data associated with waves emitted by one or more non-impulsive marine sources; to receive a source emission function associated with each of the non-impulsive marine sources; to receive at least one receiver response function; to derive a mathematical model of the data which describes the wavefield variation with source and receiver position, using at least one of the following corrections: receiver motion correction, source motion correction, receiver response correction; and/or source emission correction, and to use the model to output data representative of stationary source and receiver data.

BRIEF DESCRIPTION OF THE DRAWINGS

For a more complete understanding of the embodiments, reference is now made to the following descriptions taken in conjunction with the accompanying drawings, in which:

FIGS. 1A-B are graphical illustrations of un-blended seismic data;

FIG. 3 is a flowchart of a method for compensating for source signature effects in seismic data according to an exemplary embodiment;

FIG. 21A shows directional source signatures including free surface ghost relating to a marine airgun array;

FIG. 21B shows the amplitude spectrum for each trace in FIG. 21A;

FIG. 22A shows a receiver response function relating to a point receiver including free surface ghost;

FIG. 22B shows the data in FIG. 22A in the f-x domain;

DETAILED DESCRIPTION

Figure 2A:
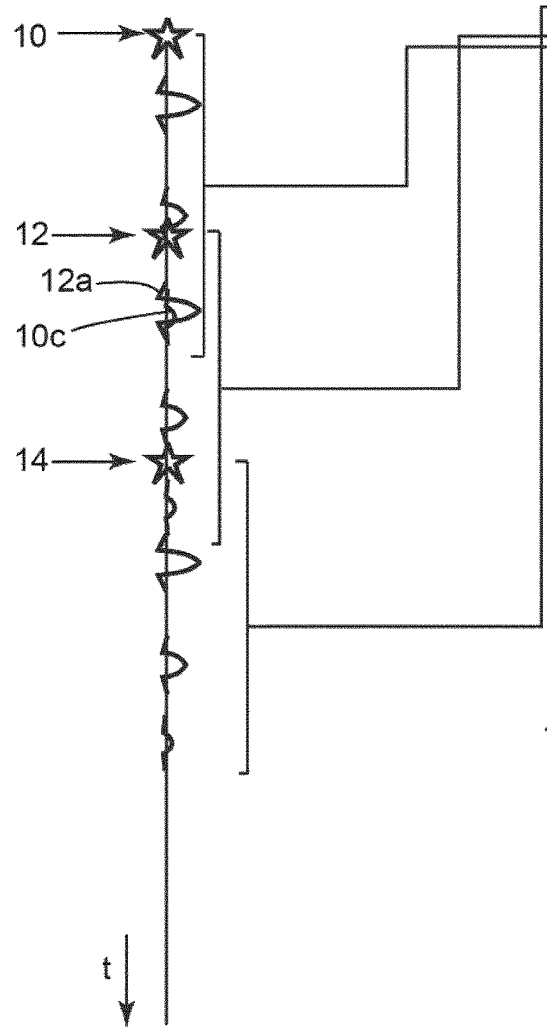
FIGS. 2A-B are graphical illustrations of blended seismic data.
Figure 2B:
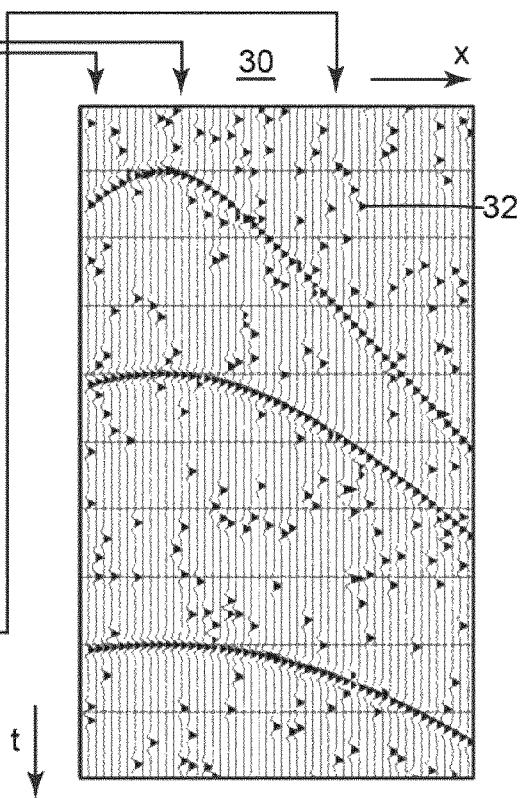

The following description of the exemplary embodiments refers to the accompanying drawings. The same reference numbers in different drawings identify the same or similar elements. The following detailed description does not limit the invention. The following embodiments are discussed, for simplicity, with regard to the terminology and structure of a towed marine seismic system. However, the embodiments to be discussed next are not limited to a marine seismic system, but may be applied other types of seismic systems, such as a land-surface seismic system or a seabed cable/node survey system. The method is also applicable to transition zone studies where energy emitted by a marine source is recorded on land.

Reference throughout the specification to "one embodiment" or "an embodiment" (or "aspect" or "example") means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Conventional source-designature techniques derive a Wiener (least-squares) shaping filter to convert the farfield signature of the source (e.g., the characteristics of the source as received at a hydrophone) to a desired wavelet (e.g., a zero phase wavelet with broad bandwidth) and then apply the shaping filter to the data. In some cases where the amplitude spectrum does not need modifying, a correlation with the emitted signal may be used instead of a full deconvolution. In one application described herein, designature of moving sources is performed. The designature operator may be 1D, e.g. based on a vertical farfield signature, or 2D or 3D. The recorded data may include pressure or particle-motion data (e.g., accelerometer, geophone, differential pressure, particle velocity, etc.).

According to an exemplary embodiment, there is a method for compensating for source signature effects in seismic data. Seismic data are received, as are data of the seismic waves generated by the moving seismic source and the position of the source. A transform operator is determined using the source data and the position data and a seismic model is determined by mathematically optimizing a relationship between the transform and the seismic data. Source signature effects in the seismic data are then compensated for using the seismic model.

Some of the novel features of one or more embodiments are related to the fact that the novel method produces a model of the subsurface from which different configurations of seismic data can be extracted. One or more embodiments generate data representative of a modified source emission (e.g., impulsive) from a dataset recorded with emission (e.g., continuous) as the source is moving. After the impulsive data has been generated, it may advantageously be used with regular processing algorithms. Additionally, one or more embodiments are useful for being used for source- and receiver-directivity compensation or for deblending data acquired with simultaneous shooting.

Various novel features are useful for marine acquisition systems in which a source timing dither is used to introduce randomness into the acquisition. For this situation, the novel method receives the source emission and position as a function of time. Any variation in emission can therefore be incorporated into the subsurface model. This advantageously permits working with seismic traces for emulated sources, as discussed below, rather than with a continuously recorded record.

FIG. 3 shows a novel method for implementing various novel features noted above. According to the exemplary embodiment illustrated in FIG. 3, a step 300 includes receiving seismic data D recorded with a receiver. The seismic data can include recordings of the Earth response to seismic waves generated by a moving source, e.g., reflections, refractions, or diffractions, as discussed below with reference to FIG. 4. The seismic data can be, e.g., a continuous receiver trace or a receiver gather from a moving marine source, expressed in a time-offset domain. Seismic data D can be land data or marine data, as discussed above. Seismic data D can be recorded with a given source directivity. Seismic data D can be recorded during a narrow-azimuth seismic survey with a source-receiver offset primarily in one direction, or during a wide-azimuth seismic survey with a source-receiver offset primarily in more than one direction.

In step 302, source data S are received. The source data S correspond to the seismic waves generated by the moving source. The source data can be expressed as a function of transmission sample index and can be expressed in the frequency or time domains. In various embodiments, the source data S represent the far-field characteristics of the source. For example, far-field source data for marine sources can be modeled using notional sources derived from nearfield hydrophone data (for example with the method of the above-referenced Ziolkowski, 1982 paper); measured directly (e.g., using a hydrophone suspended above the source array); derived from streamer or ocean-bottom measurements; or determined in other ways. For example, source data can be mathematically computed based on the characteristics and geometry of the source. The notional sources may be used to compute farfield signature(s) or the methodology may be adapted to use the notional sources directly.

The source data can be computed using signals sent to the source, e.g., a marine vibrator. In an example, when the source is a marine vibrator array, the directional source signature can be determined by first receiving measurements relating to at least one marine vibrator element, e.g., hydrophone, accelerometer or temperature measurements. The measurements may be pre-processed to remove seismic reflection energy, e.g. a waterbottom reflection, prior to deriving the notional source data. Notional source data relating to the at least one marine vibrator element are computed using the measurements. A directional farfield response of the marine vibrator source array is computed using the notional sources. In various aspects, ghosts are also taken into account as described below with reference to Equation (8). Further information about determining the far-field signature is given in French patent application 1350638, incorporated herein by reference. The driving signal for individual marine vibrators may be the same or may vary.

During processing it is possible to compensate for the source array response by shaping the farfield signature to a desired wavelet. This operation is referred to as "designature." For example, seismic data responsive to a vibroseis source vary as the source varies, not just as the subsurface varies. The waveform of the vibroseis source is removed from the recorded data to provide data representative of the seismic characteristics of the Earth being measured. The source data S are used to perform designature according to various aspects described herein. In various aspects, S includes values measured at a particular sampling rate. For example, a sampling rate of one measurement per 4 ms can be used on a vessel traveling 2.5 m/s to collect a sample corresponding to each 10 mm (distance=velocity*time=2.5 m/s*0.004 seconds=0.01 m) of travel of the vessel. For a continuous source, the amplitude of energy leaving the source changes over time.

Figure 4A:
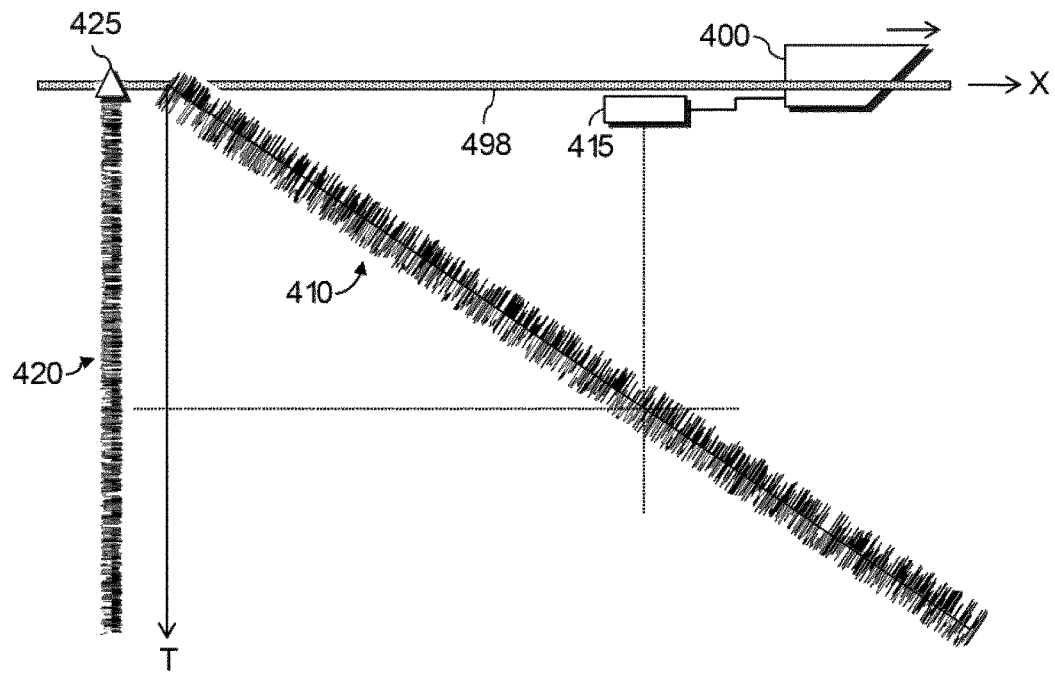
FIG. 4A is a graphical representation of a continuous marine source and corresponding seismic data according to an exemplary embodiment.
Figure 20B:
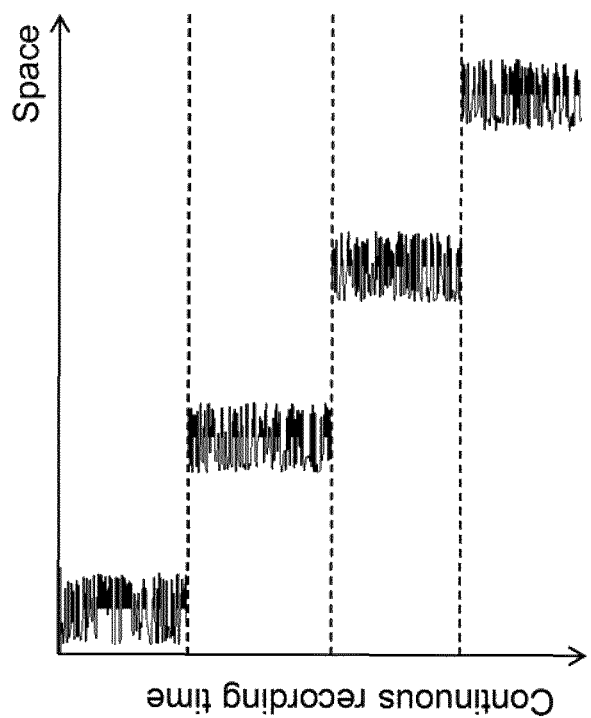
FIG. 20A shows a segment from a continuous emission based on full accuracy positioning and FIG. 20B shows an emission on a discretized positioning.
Figure 20A:
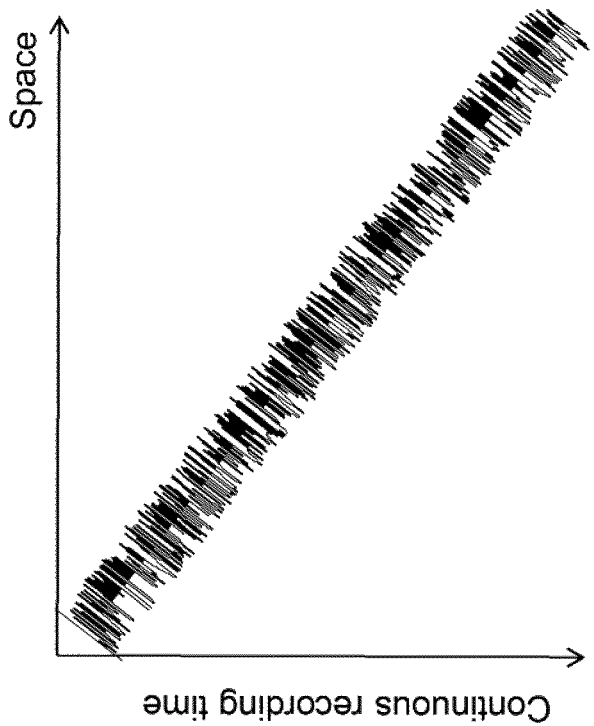

While FIG. 4A shows source emission from a moving source, it should be noted that in many cases the spatial resolution of 0.01 m is not possible/relevant and un-necessarily costly. For this reason, the spatial positioning of the emission function may be discretized in space based on the spatial resolution required. For example, FIG. 20A shows a segment from a continuous emission based on full accuracy positioning and FIG. 20B shows an emission on a discretized positioning. The discretized positioning is equivalent to a source emitting a small signal vector at a fixed position and then instantly moving in space to the next discretized position.

In step 304, position data h are received. The position data h indicate position(s) occupied by the source, or motion undertaken by the source, while the source is generating the seismic waves. The position data can be received while the source is generating the seismic waves, at a later time (e.g., from a recording), or at an earlier time (e.g., from a planned route). Data h can be provided, e.g., at each sample in the source data S. In an example, for a source moving at constant velocity v and a sampling interval $\Delta t$, h(r) for sample r is $vr\Delta t$.

The position data h can include, e.g., coordinate data collected from a navigation system such as GPS, GPS-WAAS, or eLoran. The position data can also include dead-reckoned positions determined from accelerometer data. Various examples herein use one-dimensional position values representing the distance between the source and the receiver along a selected line. Two- or three-dimensional position data can also be used. Instead of Euclidean distance, the position data h can be expressed as an offset along a particular direction, as a distance the source (or receiver) has travelled, or as a value in another reference system suitable for describing the motion of the source while firing. The choice of position data will depend on the algorithm being used.

For a moving, continuous source, the travel path the seismic energy takes through the Earth changes as a function of time. Earth responses to seismic energy provided at various times interfere with each other in the recorded data D. Source data S and position data h are used to compensate for this interference.

Figure 4B:
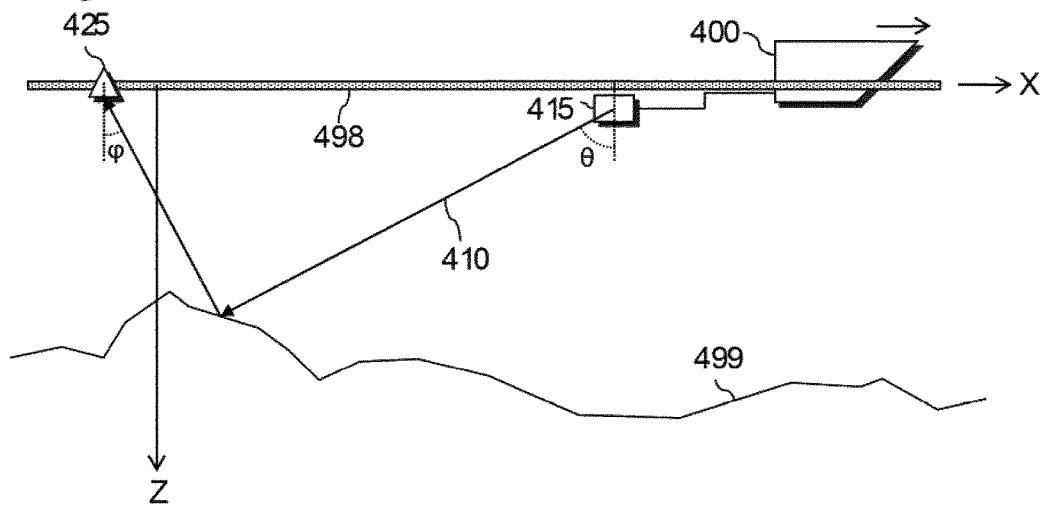
FIG. 4B is a graphical representation of exemplary seafloor geometry with respect a marine source and receiver as in FIG. 4A.

FIGS. 4A and 4B are graphical representations of operation of a continuous marine source and corresponding seismic data according to an exemplary embodiment, and illustrate the relationships between seismic data, source data, and position data. In FIG. 4A, the abscissa shows position X along a shot line and the ordinate shows time T. Signal 410 represents a continuous seismic signal emitted by source 415, e.g., towed behind a vessel 400 on a line beneath surface 498 of the water. As shown, the position from which signal 410 is emitted changes as a function of time, so source 415 sweeps out, e.g., a single fold continuous profile of the subsurface. Signal 420 represents the recorded data received at a receiver 425 in a fixed position, e.g., on a buoy or OBN. The dotted lines indicate the correlation between the depicted position of the source 415 and a specific recording time of the signal 420. This example is for a receiver with continuous recording.

In FIG. 4B, the abscissa is distance X and the ordinate is depth Z. Signal 410 is shown reflecting off the sea bottom 499 on its way from the source 415 to the receiver 425. Since the sea bottom 499 is not horizontal at the point at which the signal 410 reflects, the take-off angle $\theta$ from the source 415 is not equal to the incoming angle $\varphi$ at the receiver 425. A Doppler shift in frequency can thus be present in the received signal compared to the transmitted signal. This is discussed below with reference to step 310, FIG. 3.

Referring back to FIG. 3, in step 306, a transform operator L is determined using the source data, the position data, and a selected domain-transform operator. Examples of transform operators are given throughout, and are discussed below with reference to Equation (2). In some aspects, transform operator L is not calculated separately or in matrix form, but may be applied through a number of linear operations. Examples of such aspects are given throughout. An example is shown in FIGS. 13A-13F.

In an example, the domain-transform operator is used to transform space-time domain data, such as data of a receiver gather, into tau-p data. In an example, a least squares linear Radon model is computed. Other model domains can be used (for example f-k, parabolic Radon, hyperbolic Radon, shifted hyperbolic radon, 2D wavelet, contourlet, ridgelet, rank reduction, SVD, curvelet transform, tau-theta domain, etc). The model may be either in the time domain or a spectral domain (e.g., Fourier, z-transform, Walsch, cosine, sine, wavelet, or Laplace). The model may be 1D, 2D, 3D, or in higher dimensions. For example, frequency-domain multiplication corresponds to time-domain convolution. Throughout the remainder of this disclosure, examples are described in the frequency domain except where noted.

A linear Radon transform is a special case of a Radon transform where input data is decomposed as a series of straight lines in the time-space domain, and the straight lines are mapped to points in the tau-p domain. For example, hyperbolic events (e.g., those in shot gathers) in the time-space domain map to elliptical curves in the tau-p domain. This process is sometimes referred to as slant-stacking because, to produce the tau-p domain, the input data may be stacked along a series of straight lines.

In an example, we take the Fourier transform of input data $d=F(d_{time})$ where $d_{time}$ is data in the time domain, and d is data after temporal Fourier transform. The transform operator L links the Fourier transform impulsive source (input) seismic data d to a model p that includes a number of slowness traces in the tau-p domain:

$$d = Lp \qquad (2)$$

d is a frequency slice from the Fourier transform of the recorded seismic data, which can be recorded in the time-offset domain. The time can be, e.g., a listening time relating to the actuation time of each shot. For example, d can correspond to a 2D receiver gather of multiple shots for one frequency slice. The transform operator L can be applied to a single frequency slice at a time, or can be applied to data covering a range of frequencies. Each of d and p can be a vector, and L can be a matrix. Note that in other formulations a transform operator L can be designed to apply to the data in the time domain instead of data d in the frequency domain. In an example, the dimension of d is the number of traces in the receiver gather, the dimension of p is the number of slowness traces in the tau-p domain, and L is a linear operator matrix having a number of rows equaling the number of traces in the gather and a number of columns equal to the number of slowness traces in the model.

Figure 5B:
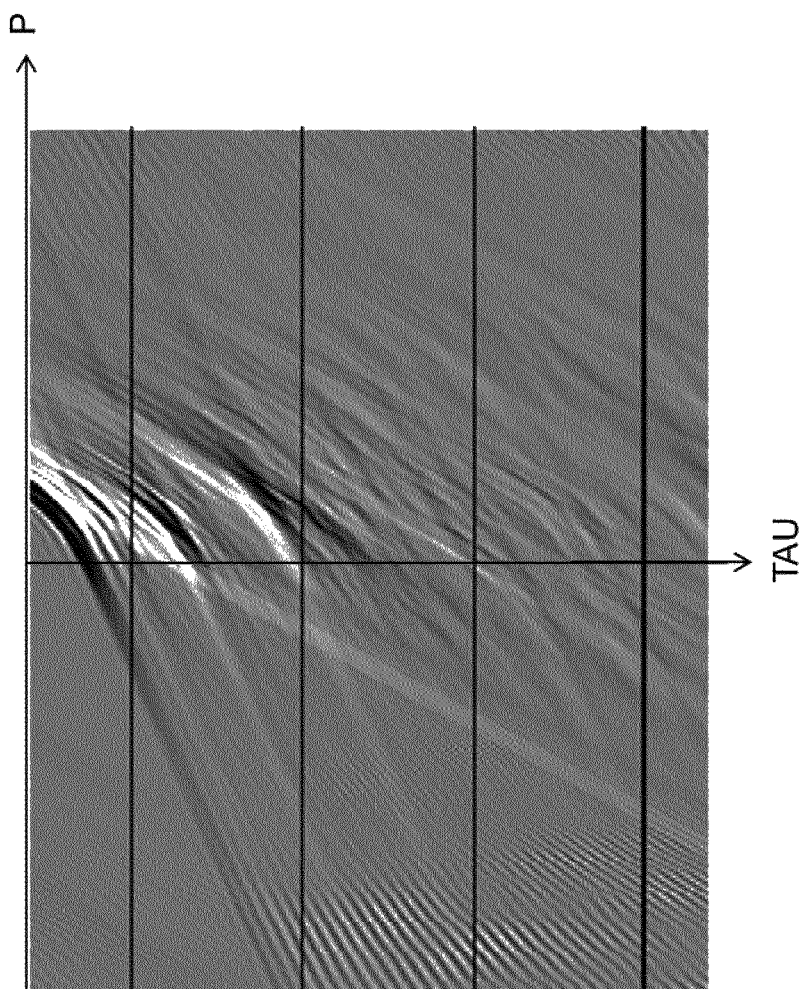
FIGS. 5A and 5B are graphical representations of an exemplary receiver gather and a corresponding tau-p model, respectively.
Figure 5A:
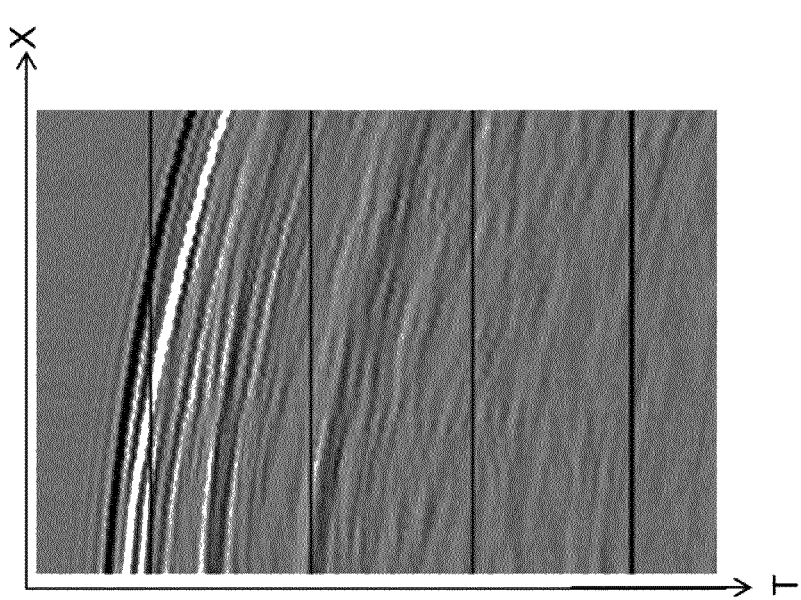

FIGS. 5A and 5B show an exemplary receiver gather and a corresponding tau-p model. In FIG. 5A, the abscissa is source-receiver offset X and the ordinate is time T (increasing downward). Gray shows zero amplitude, black is the most negative amplitude, and white is the most positive amplitude. In FIG. 5B, the abscissa is slowness trace p (in s/m, also referred to as "ray parameter") and the ordinate is zero offset intercept time tau ($\tau$). Modeling in the receiver tau-p domain advantageously separates different source emission angles based on source takeoff angle or slowness, as is discussed below with reference to Equation (7). However, other domains may be used.

The conversion from a frequency slice of tau-p data p(m) (FIG. 5B) to a frequency slice of seismic data d(n) of the gather (FIG. 5A) is:

$$d(n) = \sum_{m=1}^{M} p(m) e^{-2\pi i f s(m) h(n)} \qquad (3)$$

for:
n Data trace index
m Slowness trace index
M Number of model (slowness) traces
f Frequency (Hz)
s(m) Slowness of the $m^{th}$ p-trace (s/m)
h(n) Source-receiver offset for a given trace (m)

p(m) Tau-p model domain, slowness traces for one frequency slice (dt/dx, s/m). p(m) can be, e.g., a frequency slice from the tau-p model in FIG. 5B.

The size of the model, e.g., the number of traces, can vary depending on the survey being acquired. The number of offsets can be, e.g., a few hundred, and the number of slowness traces can be larger than the number of offsets, e.g., twice as many.

The d(n) value in Equation (3) is the frequency-domain seismic data, i.e., d in Equation (2). The M slowness traces p(m) in the tau-p domain compose model p in Equation (2). The exponential term in Equation (3) forms the transform operator L of Equation (2), here a reverse slant stack operator. The matrix-vector multiplication Lp of Equation (2) is expressed in Equation (3) with a corresponding summation. In this and other examples herein, transform operators L are not always cleanly separable from the model p to fit the form of Equation (2), e.g., as discussed below with reference to FIGS. 13A-13F. References throughout to determining a transform operator (or similar terms) can include determining or calculating values of larger equations that include terms performing functions described herein of, e.g., transform operator L.

In various embodiments, the transform L is a modification of Equation (3). Specifically, Equation (3) applies when the offset h is constant for each trace d(n). The transform L can be modified to incorporate a resignature operator R (Equation (4)). This resignature operator will be used as discussed below to develop to derive a tau-p representation of the receiver gather that is free of the influences of the directional source signature, and can be used for stationary or moving sources. When a reverse tau-p transform is applied to such a model, a receiver gather is obtained in the offset-time domain substantially free of source directivity effects. Examples of this process are described in U.S. patent application Ser. No. 13/927,566, filed Jun. 26, 2013, and entitled "Device and method for directional designature of seismic data," by Gordon Poole, and in its parent applications U.S. Provisional Application No. 61/680,823 filed on Aug. 8, 2012, U.S. Provisional Application No. 61/722,901 filed on Nov. 6, 2012, and U.S. Provisional Application No. 61/772,711 filed on Mar. 5, 2013, each of which is incorporated herein by reference, and which are discussed in more detail below.

For a given temporal frequency, the transform including the resignature operator is $$d = LSp \qquad (4)$$

where d is the N-length recorded data vector in the common receiver domain, p is the M-length model vector in the slowness domain, S is the resignature operator, and L is the N×M matrix containing the reverse tau-p transform operator. For a single source directivity, the resignature operator is a diagonal matrix of dimension M which imposes a different signature to each slowness trace in model, p. N can be, e.g., a few hundred traces. M can be larger, e.g., ~2N. Alternatively if we only consider the case of vertical designature, each element along the diagonal of S would relate to the vertical re-signature operator. The method may also be formulated so the source directivity is in 3D. The elements of L in one example are given by $$L(n,m) = e^{-2\pi i f h(n) s(m)} \qquad (5)$$

where f is the temporal frequency, h(n) is the offset of the nth trace in the receiver gather, and s(m) is the slowness of the $m^{th}$ p-trace. Equation (5) represents time shifts in the temporal frequency domain ($e^{2\pi i f \tau}$).

In various aspects, the operations of re-signature and reverse slant can be combined into a single matrix; $L_S=LS$. In other aspects, instead of having a single directional re-signature operation (e.g., with the same source directivity for all shots), a different source directivity can be used for each shot. This can be achieved by further modifying L so as to multiply each element by the appropriate re-signature filter. The size of L is the number of shots by the number of slownesses, this is consistent with a different directional resignature filter for each shot.

Including 2-D source directivity, the resignature operator $S_{2D}$ is a function of n and m; $S_{2D}$ (n,m) is the resignature operator at a frequency of interest for the $m^{th}$ slowness, i.e., the $m^{th}$ column of data in the tau-p model, and the $n^{th}$ shot, i.e., the $n^{th}$ column of data in the receiver gather. In this case $L_S$ is formed through an element-by-element multiplication of the values in L(n,m) with the values of $S_{2D}$(n,m). The model p is found by inverting Equation (4), e.g., in a least squares sense. Other mathematical formulations for inverting Equation (4) can also be used, e.g., an iteratively re-weighted technique that enforces sparseness or high resolution on the tau-p model (see the above-referenced Trad 2003 paper).

Various aspects relate to a moving source exhibiting non-impulsive emission with continuous recording at a stationary receiver. These aspects can sum (integrate) the contribution from the source emission, taking into account the varying source position as the source travels relative to a stationary receiver. Seismic data d(f) (from step 300) for a given frequency f can be related to the energy S that left the source (from step 302) and to the source position h as a function of time (from step 304):

$$d(f) = \sum_{r=0}^{R} \left[ S(r, f)e^{-2\pi i fr\Delta t} \sum_{m=1}^{M} p(m, f)e^{-2\pi i fh(r)s(m)} \right] \quad (6)$$

using:
f Frequency (Hz)
r Source emission sample index
S(r,f) Source emission, function of emission sample index and frequency. This may relate to the source energy in the vertical direction or another direction.
$\Delta t$ Source emission sample rate (seconds)
h(r) Source-receiver offset as a function of emission sample (e.g. h(r)=vr$\Delta t$)
m Tau-p model trace index
s(m) Slowness of $m^{th}$ tau-p model trace (s/m)
P(m,f) Frequency domain tau-p model; function of model trace and frequency.

As before the definition of S relates to the source emission, although for the moving non-impulsive source we define this to be a function of time through the source emission index, r, and frequency, f. The right hand summation relates to a reverse slant operation based on a discrete offset, h(r), relating to a source emission at an instance in time. This energy is then shifted by the delay time r$\Delta t$ based on the emission time with the left hand exponential term. Finally the resulting energy experiences a resignature operation through multiplication with S (equivalent to a convolution in time). The energy for all source emission samples are combined with the left hand summation. For a given frequency, the model domain p can include several hundred to a few thousand slowness traces. The size of S can be the time elapsed while acquiring data, e.g., several hours for a seismic line, divided by the source emission sample rate, $\Delta t$. For example, 10 hours=36000 s, so with a 4 ms sample rate the length of S would be 36000/0.004=9×10$^6$ samples. Alternatively, the source may be configured to sweep for a given duration (e.g. 600 seconds) and then not emit any energy for the duration of the listening time. In this case, each 600 second segment may be processed separately which may be computationally more efficient. In aspects using a single receiver, d(f) is a single complex number for any given f. For aspects using more than one receiver, d(f) is a vector for any given f.

In Equation (6), matrix and vector multiplications similar to Equation (4) are expressed with corresponding summations. Equation (6) can encompass the effects of both Doppler shift and varying travel path through the earth, along with re-signature, to generate a continuous recording trace where the emitted energy is known as a function of time (or, for a moving source, position).

FIGS. 13A-13F illustrate an example using hyperbolic reflection times for five impulsive sources travelling from left to right with a stationary receiver. This is an example of forward processing using the principles of Equation (2). FIGS. 13A-F illustrate steps in equation (6) to transform data from the tau-p domain to simulate recorded data d according to various embodiments. In various embodiments of methods described herein, the linear system of Equation (2) is inverted to obtain the model p, using which output seismic data can be determined for an emulated source. Specifically, for example, the model p can be a model constructed using data from a vibroseis on non-synchronized impulsive (e.g. airgun) source, and the inversion can output data from an emulated impulsive source.

Figure 13A:
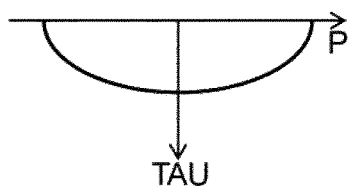
FIGS. 13A-13F illustrate an example of a transform operating on hyperbolic reflection times for five impulsive sources travelling from left to right with a stationary receiver.

FIG. 13A shows an exemplary tau-p model 1310 (p).

Figure 13B:
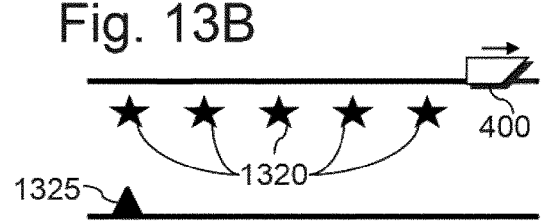

FIG. 13B shows source excitation offsets 1320 of a moving marine seismic source, e.g., carried on vessel 400. FIG. 13B also shows a fixed receiver 1325, e.g., at the waterbottom.

Figure 13C:
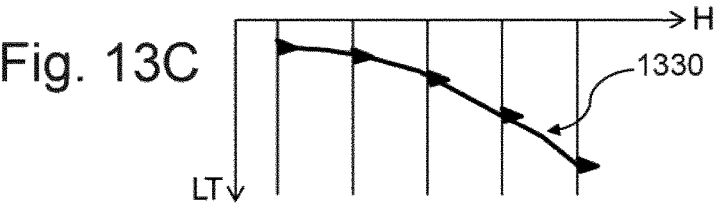

FIG. 13C shows data 1330 generated from the tau-p model 1310. The abscissa is offset h and the ordinate is listening time (LT, increasing down). The data 1330 is produced at discrete offsets 1335 relating to the source excitation offsets 1320. The transformation from FIG. 13A to FIG. 13C relates to term $\Sigma_{m=1}^{M}p(m,f)e^{-2\pi i fh(r)s(m)}$ from Equation (6).

Figure 13D:
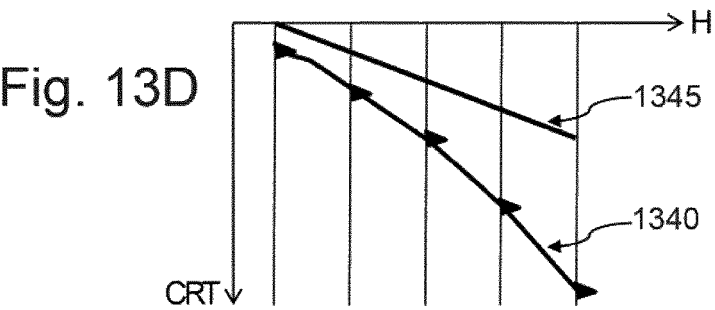

FIG. 13D shows time-shifted data 1340. The abscissa is offset h and the ordinate is continuous recording time (CRT, increasing down). The time-shifted data 1340 is provided by shifting the produced data 1330 based on a source excitation time profile 1345, e.g., a continuous recording timeline. This shifting converts the data from a listening time to a continuous recording timeframe. The transformation from FIG. 13C to FIG. 13D relates to term $e^{-2\pi i fr\Delta t}$ in Equation (6).

Figure 13F:
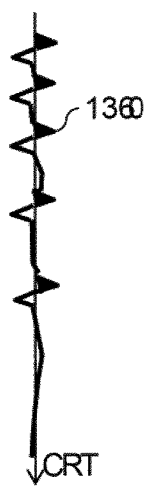
Figure 13E:
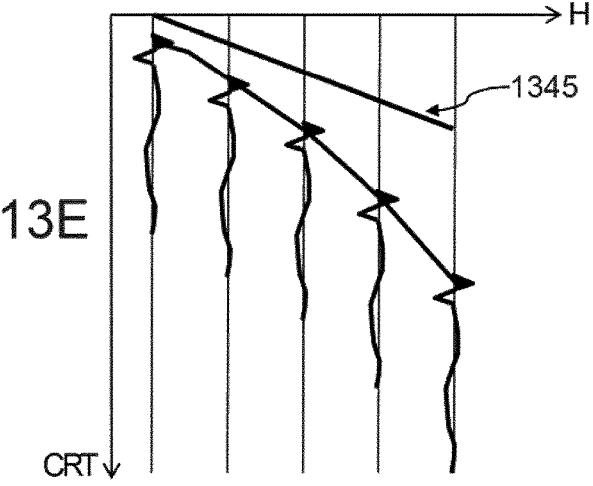

FIG. 13E shows data 1350 provided by convolving a source farfield signature (not shown) with the time-shifted data 1340. This step relates to the multiplication by S(r,f) in Equation (6). The abscissa is offset h and the ordinate is continuous recording time (CRT, increasing down). An exemplary source farfield signature of an impulsive airgun source includes a source ghost and bubble. An exemplary source farfield signature of a vibroseis source (not shown) includes an output series with ghost. While the spatial sampling for an airgun source may be in the range of 10 to 50 m, the marine vibrator can be considered as emitting impulses every 10 mm as previously discussed.

FIG. 13F shows a trace 1360 provided by combining the data 1350 from each of a plurality of sources through a summation. This step relates to the summation $\Sigma_{r=0}^{R}$ in Equation (6). In embodiments inverting the linear system described by Equation (2), the trace 1360 corresponds to a known recorded trace. The ordinate is continuous recording time (CRT, increasing down).

In various embodiments, the effect of processing steps described above with reference to FIGS. 13A-F is to linearly transform the tau-p model of FIG. 13A to the trace 1360 of FIG. 13F (time-shifting, addition, and convolution are all linear operations). Accordingly, the effects of these steps can be obtained by multiplying the tau-p data by a single matrix (the linear operator matrix L) formed as the product of matrices representing the individual steps. In an example, the values of this matrix can be computed, and the matrix can be inverted to determine the output seismic data. In another example, the values of the matrix are not computed. Instead, steps described above with reference to FIGS. 13A-13F are performed in order, either forward or backwards (adjoint operations).

In an example, various steps described herein with reference to FIGS. 13A-13F are performed in reverse in a least-squares or other mathematical-optimization framework (e.g. conjugate gradients) to determine the tau-p model 1310. The tau-p model 1310 can then be used to provide output seismic data, e.g., by using emulated-source data in place of the source farfield signature discussed above with reference to FIG. 13E, and/or using emulated position data in place of the source excitation offsets 1320.

Referring back to FIGS. 5A-5B, the source data S in Equation (6) is a function of emission time (or position) and frequency. This means that at any time the source may output a time varying signal at the relevant position in space. The time-varying signal may be from an impulsive source, a continuous source, or both impulsive and continuous. In an example of an airgun fired every 25 m, data S includes an airgun response every (25 m)/v seconds. The emitted source energy may be described in the continuous time-space domain or spectral forms thereof, e.g. in the $F_{cont}K$ domain.

Throughout this disclosure, the spatial summations in various equations can be replaced by analytical mathematical integration operations. A continuous source can then be defined by a mathematical function. In various embodiments that process data from continuous sources, the summations (integrations) over spatial positions in various equations can include a weighting term for each emission position. Weighting terms can be varied to permit correcting for variations due to non-constant vessel speed. For constant vessel speed, the tau-p model as a whole can be scaled uniformly, e.g., by a constant, and still be consistent with the recorded data S(t). S(t) can be a continuous function of continuous recording time.

Referring back to FIG. 3, in step 308, a seismic model is determined by mathematically optimizing a relationship between the transform and the seismic data. That is, p in Equation (4) is determined from the known d and linear operations, L. d is the seismic data recorded in step 300, e.g., a continuous recording trace indexed by time in milliseconds. L is the transform operator determined according to Equation (6) from the source data S and the location data h (steps 302 and 304, respectively). S and h together give source emission as a function of space and time (or frequency, depending on the domain selected). L is computed so that it includes a model transform and a resignature operator, so its inverse includes an inverse reverse model transform and a designature operator.

Equation (4), being linear, can be inverted to solve for p using known techniques for the solution of linear systems of equations. A closed-form solution sometimes cannot be expressed because cross-talk noise and other noise from the source(s) will affect the domain models. Accordingly, Equation (4) can be inverted using an iterative approach such as a least-squares technique. For example, the least squares Radon process solves linear equations, finding the tau-p model that, when reverse slant-stacked, reproduces the input data as accurately as possible in a least squares sense. Similarly, various equations described throughout this disclosure may be solved in similar ways. This discussion is not limited as regards factors such as the type of solver used, how stabilization weights are calculated, or the norm of the solver. In addition, iterative cleaning methods similar to the anti-leakage Fourier transform may be used. In various embodiments, iterative cleaning methods (sometimes known as "matching pursuit") determine model components one a time, e.g., in decreasing order of signal strength. Each time a model component is derived, effect(s) of that component are removed from the input data before determining later model components. Iterative cleaning can be used instead of inverting using sparseness weights.

There are many ways to solve for p. Some examples of solvers are LU decomposition, Cholesky factorization, steepest descent, simulated annealing, and conjugate gradients. The model and/or data norm for the solver can be L1, L2 (e.g., for least-squares), Cauchy, or any other norm. Sparseness constraints may be applied, with weights derived as necessary. A windowed approach (e.g. in space and/or time) can also be used in solving for p. Constraints (e.g. Lagrange constraints) can be added to the model for stabilization. The method may be designed to derive a model for a number of spatial windows simultaneously. Each model would represent a small spatial area of the Earth response which would reduce data complexity and improve the effectiveness of the use of sparseness weights. The spatial areas may overlap and certain spatial positions may contain contributions from more than one model. Additive noise can be added to stabilize inversion. The noise may change with frequency, based for example on the signal to noise ratio variation with frequency.

In various aspects, the source data S are not accurately known. In some of these aspects, Equation (4) can be replaced with a non-linear equation in which the emission signal and resulting model domain are both permitted to change within selected constraints. In this case, a Jacobian matrix of partial derivatives can be computed and used with, e.g., a Gauss-Newton, ridge regression, stochastic, Marquardt-Levenberg, or other non-linear solver. This advantageously linearizes the link between model and data spaces based on calculating partial derivatives relative to each model parameter.

In an embodiment, a linear system according to Equation (4) is inverted with conjugate gradients to solve for p. This embodiment has the advantage that it is not necessary to explicitly compute L. Instead, it is only requisite to know how to apply L and $L^T$, which is the transpose or adjoint of L. Specifically, the conjugate gradient algorithm solves Equation (4) through the successive application of L and $L^T$, where $L^T$ is the transpose of L. For frequency domain solvers, $L^T$ would become $L^H$=conjugate($L^T$). For over-determined systems (when the number of model points is smaller than the number of data points) the model p, can be found by solving the equation $L^T d = L^T L p$. In this case, the method first calculates $L^T d$ as d is known. Then the conjugate gradients process applies L followed by $L^T$ to iteratively find p. For an under-determined system (when the desirable number of model points is larger than the number of data points), the model p can be found by solving the equation d=LL^TL^{-T}p. In this case, the method considers $L^{-T}p$ to be the unknown and the process of conjugate gradients iteratively applies LT followed by L to d to find $L^{-T}p$. When $L^{-T}p$ has been found, the method pre-multiplies it by $L^T$ to find p.

In this embodiment, step 308 includes applying the transform operator L and an adjoint operator $L^T$ using conjugate gradients to the input data d to derive a linear model p of the seismic data. Examples of this process are described in U.S. patent application Ser. No. 13/927,566, filed Jun. 26, 2013, and entitled "Device and method for directional designature of seismic data," by Gordon Poole, and in its parent applications U.S. Provisional Application No. 61/680,823 filed on Aug. 8, 2012, U.S. Provisional Application No. 61/722,901 filed on Nov. 6, 2012, and U.S. Provisional Application No. 61/772,711 filed on Mar. 5, 2013, each of which is incorporated herein by reference. An example is discussed above with reference to FIGS. 13A-13F.

In an example in the time domain, L can be applied to map tau-p data to continuous-recording data by first inputting the tau-p model and source emission signals, e.g., signal 410 in FIG. 4A. For each of the emission signal samples (r), processing can be performed, e.g., according to Equation (6). Specifically, the offset relating to the current sample (e.g., $rv_b\Delta t$) can be calculated or retrieved from a look-up table. A reverse slant stack can be performed to generate a trace at that offset. The trace is then convolved with an appropriate source emission function to add the source signature back into the trace (a "resignature" operation). The post-re-signature trace is then added into an emulated continuous recording trace starting at sample r.

Continuing this time-domain example, $L^T$ can be applied to map continuous-recording data to tau-p data by inputting the continuous recording trace and source emission/position data. For each of the emission signal samples (r), processing can be performed. The offset relating to the current sample, e.g., $rv_b\Delta t$, is computed. An appropriate time window is extracted from the continuous recording trace. The time window can begin with the current sample r and extend forward for a selected span of time long enough that all significant energy from a source firing at sample r will have dissipated. A forward-slant operation is performed on the data from the extracted time window with the calculated offset for all slownesses. The result is then correlated with relevant source emission function to perform the adjoint of the resignature operation discussed above. This correlation can be, e.g., the adjoint of a convolution in a resignature operator. The result can then be added into the tau-p transform. After applying $L^T$, the tau-p sparseness can optionally be updated. The number of times the sparseness is updated will depend on the complexity of geology and similarity of sweeps between the vibrators. This number can be a user parameter. Further details of sparseness are provided in U.S. Patent Application Publication No. US2013/0176819, incorporated herein by reference.

Equation (6) can be modified to represent additional variations in the energy leaving a source. For example, some sources emit energy in a way that varies by take-off angle, e.g., sources below a free surface such as a water-air interface. Such source data can be expressed as a function of sample index, frequency, and slowness, or using other representations appropriate for the domain of the selected model. Such representations permit removing source signature effects for sources that emit a variable signature with angle. Tau-p transforms using frequency-slowness representations advantageously separate different source emission angles. This is because, in the tau-p domain, each p trace corresponds to one distinct direction in which a seismic wave is radiated from the source. Thus, the various take-off angles of seismic energy can be readily discriminated in tau-p models. Variation of energy with takeoff slowness may be in 2D or in 3D.

When the source emission is known as a function of take-off angle, compensation for source directivity can be performed. This can be done with respect to any of the source types outlined earlier. Source data S include amplitudes for a range of source take-off angles (e.g. relating to each slowness in the tau-p domain). FIG. 21A shows directional source signatures relating to a marine airgun array. The figure shows the impulsive positive peak 2101 followed by an impulsive negative peak 2102 relating to the free surface ghost. Lower frequency energy follows the initial impulses 2103 which relate to bubble pulse energy. It is noted that the ghost timing decreases with the magnitude of the slowness, converging to zero for horizontal takeoff angles. FIG. 21B shows the amplitude spectrum for each trace in FIG. 21A. The white ghost notch observed at zero-slowness at 75 Hz moves to higher frequencies with increasing slowness. Instead of Equation (6), Equation (7) relates seismic data d (from step 300) for a given frequency f to the energy S that left the source (from step 302) at a given angle (slowness m), and to the source position h as a function of time (from step 304):

$$d(f) = \sum_{r=0}^{R}\left[e^{-2\pi i fr\Delta t}\sum_{m=1}^{M}S(r,m,f)p(m,f)e^{-2\pi i fh(r)s(m)}\right] \quad (7)$$

Figure 24:
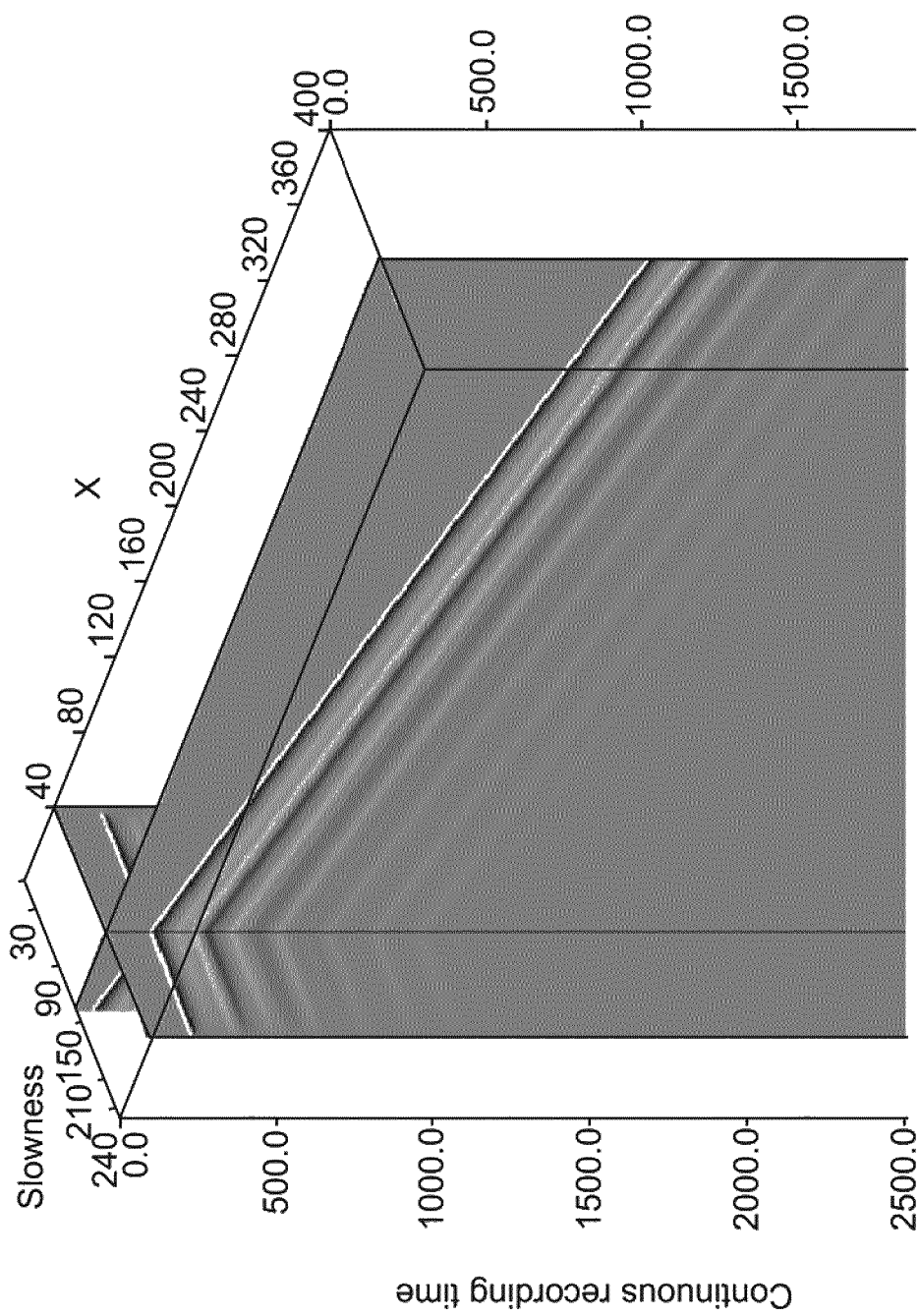
FIG. 24 shows a continuous emission based source term displayed pictorially for an impulsive source.

The emission (or re-signature) term, S varies with sample value r, frequency f, and model slowness parameter m. Equation 7 is similar to equation 6, with the exception that the source emission term has gained a slowness dimension and has been moved under the right hand summation. This allows the source emission to change with space and takeoff angle. S can have, e.g., the same dimensions as discussed above with reference to Equation (6), except with an extra dimension relating to m. The limit M can be the number of slowness traces, e.g., several hundred to a few thousand. Term S in equation (7) relates to energy emitted as a function of time, the first exponential term may be considered to shift this emission to a continuous emission time. Alternatively a continuous emission based source term may be defined as $S_{CE}=e^{-2\pi i fr\Delta t}S(r,m,f)$ which is displayed pictorially for an impulsive source in FIG. 24. This may be considered as a directional emission function version of FIG. 4A, but for impulsive source data.

Equation (7) is a formulation useful for sources with an angle dependency of emission. The re-signature, adjoint re-signature, and designature operations discussed above can be modified to relate to a different value for each slowness as set forth in Equation (7). In an example, to apply L to convert from tau-p to a continuous recording, the tau-p model and source emission signals are received. For each of the emission signal samples (r), processing is performed. Specifically, the offset relating to the current sample (e.g., $rv_b\Delta t$) is calculated or received. Each slowness trace in the τ-p model is then convolved with the emission function (source signature) for the determined offset (instance in time), which is the modified re-signature operation. A reverse slant stack operation is then performed to generate a trace at the determined offset, and that trace is added into the continuous recording trace starting referenced by sample r. The τ-p model can be reused unmodified for each emission signal sample.

Likewise, to apply $L^T$ (or $L^H$ as discussed previously) to transform continuous recording data to a tau-p model, the continuous recording trace and emission signals are input. Processing is performed according to Equation (7) for each emission signal sample (r). The offset relating to the current sample (e.g., $rv_b\Delta t$) is calculated. A relevant time window is extracted from the continuous recording trace. A forward slant operation is performed on the data in the time window with the calculated offset for all model slownesses. Each slowness trace in the result is then correlated with the relevant emission signal time and position; this is an adjoint of the resignature operation. The resulting data are then added into the tau-p transform In another example of additional source effect, source ghosts are a significant factor in much seismic data, especially marine data. A marine source ghost is a response of the earth to a seismic wave that reflected off the surface of the water before travelling down and reflecting off subsurface features. That response appears as if from a source above the surface of the water. The source emission data S may be coded to include the source ghost. Alternatively, two source functions may be used; one for the source position and one for the ghost (mirror) source position. In general, any number of source elements (e.g. airguns or individual marine vibrators) may be included in source data S, or any number of source functions S can be received and used in Equation (6), as discussed below with reference to FIG. 6. If the resignature operation described above contains a free surface source ghost, the resulting tau-p model will be free of source ghost effects. This ghost-free model can then be used to output seismic data after full source designature and deghosting, as described herein. Alternatively, a source ghost may be re-encoded for the output data, based on the same depth or depths as the input data, or at other depths.

To generate the output data, the source re-signature operator r can relate to a real scalar for all frequencies for a continuous source. For example, for a point source with no directivity, the pressure pulse output at any given instant in time could be considered as a spike (e.g., a Dirac impulse) time-shifted by the continuous recording. Operator S can encode the source signature with the source ghost, and can encode source array effects. Having a source signature for each spatial location, as a function of frequency or time, permits synthesizing of seismic data corresponding to stationary impulsive sources, continuous sources, or a combination of both. This strategy could be used in order to be consistent with a baseline survey from a timelapse dataset. The output data may be produced based on continuous recording time or on listening time.

Figure 6:
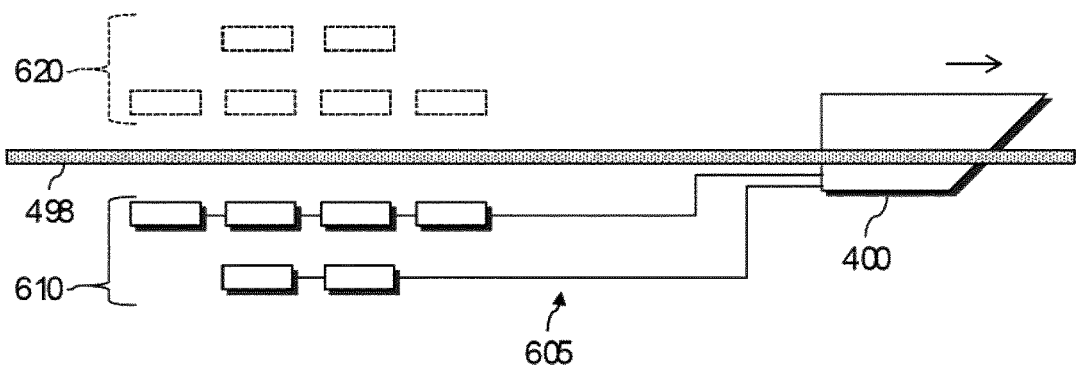
FIG. 6 shows an elevation of a representative marine seismic vessel with multiple sources according to various aspects.

FIG. 6 shows an elevation of a representative marine seismic vessel 400 with a source including six source elements 610, e.g., trailed on lines 605 below the surface 498 of the water. (In other embodiments, the six source elements are separate sources.) The corresponding ghost source elements 620 are shown in the positions from which ghost signals appear to originate. The source 610 and ghost 620 elements may be considered to output a single pressure at a given instant in time. The vertical net output of the array of sources 610 and ghosts 620 can be expressed as:

$$S(r, f) = \sum_{a=1}^{A} O(a, r, f)[e^{2\pi i f z(a,r)/v_w} + Re^{-2\pi i f z(a,r)/v_w}] \quad (8)$$

using:

S(r,f) Net source response for each frequency, f (Hz)
O(a,r,f) Output of each source element for a given frequency 610
z(a,r) Depth of each source below the surface 498 of the water (m), e.g., between 4 m and 50 m. May vary with emission time.
R Sea surface reflectivity, normally −1
A Number of source elements (e.g., 30 to 50 for airguns or higher for marine vibrators)
$v_w$ Water velocity (m/s); e.g. 1490 m/s.
r Continuous emission time index.

The output of each source element may be based on measured data, or on the driving signal. In Equation (8), the first exponential term relates to source elements 610 and the second exponential term relates to the ghost source elements 620. The reverse Fourier transform of the resulting signal (S(f)) represents the time series leaving the source array vertically at any point in time. Note that the depth of each element may be constant or vary for different elements. Also, the depth may vary as a function of emission time, r. Equation (8) can be applied to impulsive or vibratory sources. Impulsive source elements may be triggered synchronously or asynchronously. Equation (8) can also be modified to include angle-dependent terms (i.e. beamforming), as discussed above.

$$S(r,m,f) = \sum_{a=1}^{A} O(a,r,f)[e^{2\pi i f s_z(m)z(a,r)} + Re^{-2\pi i f s_z(m)z(a,r)}] \quad (9)$$

The above equation applies re-datum and re-ghost based on slowness in the depth (z) direction, $s_z$. While this quantity is not a model parameter, in 2D it is a function of slowness in the x-direction based on the following relationship:

$$S_z^2 + S_x^2 = \frac{1}{v_w^2} \quad (10)$$

Equations (9) and (7) may be combined as follows:

$$d(f) = \sum_{r=0}^{R} \left[ e^{-2\pi i f r \Delta t} \sum_{m=1}^{M} p(m, f) e^{-2\pi i f h(r) s(m)} \right.$$
$$\left. \left\{ \sum_{a=1}^{A} O(a, r, f)[e^{2\pi i f s_z(m)z(a,r)} + Re^{-2\pi i f s_z(m)z(a,r)}] \right\} \right] \quad (11)$$

In equation (11) the right hand summation forms the directional farfield signature including ghost based on the model parameter and depth of each vibrator element which replaces S(r,m,f) in Equation (7). Note that the vibrator depths may also change with time, as shown the depth is a function of vibrator element and emission time, z(a,r).

Referring back to FIG. 3, as a result of the above-described steps 300, 302, 304, 306, and 308, a seismic model p of the seismic data d is produced. This model can be reported or analyzed on its own, or used as an input to further processing. For example, in step 310, compensation is performed for the source signature effects in the seismic data using the source data and position data, e.g., directly, or in the form of the seismic model p. Step 310 can include various combinations of steps 322, 322, 324, and 326, as discussed below.

In various embodiments, the seismic model p is used to provide output seismic data. For example, data collected using a non-impulsive source can be processed to provide data that would have been produced using an impulsive source. This advantageously permits geophysicists to use the experience they have gained analyzing data from impulsive sources to analyze data from non-impulsive sources. Moreover, the collected data can be processed to provide data representative of the response of the Earth to a zero-phase or minimum-phase wavelet. Providing such data advantageously permits applying other processing steps to, e.g., reduce noise or migration the seismic data. The output seismic data can correspond to source positions representative of impulsive source data anywhere along the route a continuous source traveled during capture of seismic data d.

For airgun acquired data, airgun refilling times with commonly-used airguns prohibit the use of small source intervals (e.g. less than 18.75 m). In various embodiments, the output seismic data correspond to an impulsive source fired every, e.g., 6.25 m, 18.75 m, 25 m, or at other regular sampling intervals in distance or time. The output sampling may not have been physically achievable with an impulsive airgun source and may be on as fine a grid as desired. In other embodiments, the output seismic data represents data corresponding to an impulsive source fired at irregular intervals, e.g., at positions measured in a previous or later vintage of a time lapse study. In yet other embodiments, the output seismic data correspond to sources relating to another survey, e.g., for survey merging. In various embodiments, the output seismic data is free of the source signature, and/or free of the source ghost. In other embodiments, the output seismic data corresponds to an emulated seismic source with a selected source ghost response or a selected signature, e.g., a farfield signature relating to another dataset for multi-dataset merging, or a farfield signature from a time lapse vintage. As discussed above with reference to Equation (7), in some embodiments, the emulated-source data representing the output of the emulated seismic source vary by take-off angle. In these embodiments, the output seismic data can correspond to sources exhibiting such angular variation. The angular variation may be in 2D or 3D. If no angular variation is needed, the angular terms may be replaced with the vertical term or a term relating to another direction. In various embodiments, the emulated-source data are defined by point source elements with or without source and/or receiver free surface ghost effects.

In various embodiments, the output seismic data can correspond to a shot from a stationary source, measured at a stationary receiver. Accordingly, the output seismic data do not exhibit errors due to Doppler effects. By producing output seismic data as discussed below, compensation for Doppler effects is carried out. In other embodiments, the source data S are adjusted to include compensation for Doppler effects. In an example, a directional source resignature operation describes source output as a function of slowness or takeoff angle. The takeoff angle relative to the direction of source motion defines a Doppler shift. This shift can be applied to the directional source resignature function.

To provide such emulated-source data, in an exemplary embodiment, in step 320, emulated-source data are received. For example, the emulated-source data can represent energy emission as a function of time, e.g., the emissions that would produce the continuous recording 16 shown in FIG. 1A. The emulated-source data can vary by take-off angle, e.g., as discussed above with reference to Equation (7).

In some embodiments, output seismic data are provided for a moving emulated source. In these embodiments, in step 322, emulated position data. i.e., position data corresponding to the emulated-source data, are received.

In step 324, a second transform operator is determined using the emulated-source data and the domain-transform operator. If emulated position data were received (step 322), the second transform operator is determined further using the emulated position data. If the emulated-source data vary by take-off angle, the second transform operator is further determined using that angular variation.

In step 326, the determined second transform operator is applied to the determined seismic model to provide output seismic data corresponding to the received emulated-source data.

In some embodiments, more than one source is used simultaneously to capture the data. In these embodiments, step 302 includes receiving source data for each of a plurality of sources. Step 304 includes receiving respective position data for each of the plurality of sources. Step 306 includes determining the transform operator using the respective source data, the respective position data, and the selected domain-transform operator.

These sources can be shot non-overlapping (e.g., FIG. 1A) or simultaneously or overlapping (e.g., FIG. 2A). Accordingly, energy from more than one of the sources can interfere. Each source can use the same or different emission signals and can be fired at regular, dithered, random, or other time intervals. The emissions signals may be substantially covering the same bandwidth, or may cover different bandwidths. The different bandwidths may overlap such that some frequencies are emitted by two or more sources.

In an example, each source has its own emission signal, which can vary by take-off angle as well as over time if required. The emission signals (source data) can be orthogonal or pseudo-orthogonal (to facilitate signal separation) or not. Two signals will be fully orthogonal in the case that when we correlate by one source, any cross-contamination from the other source would be zero (or as close to zero as numerically possible). One example of orthogonal signals would be two signals at different frequencies. In the case we want to emit the same frequencies for both sources (at least for some of the bandwidth), full orthogonality may not be possible. In this case, we may design signals to be as orthogonal as possible, or pseudo-orthogonal, examples of pseudo-orthogonal signals may include Kasami sequences, Reed-Muller codes, ternary codes, q-ary codes, Golay binary codes, Golay ternary codes, Gold codes, or other signals designed to be orthogonal or weakly correlated to each other over some time interval of interest (for example see U.S. Pat. Nos. 8,619,497, 7,859,945, 4,168,485 and 6,807,508). In this example, a separate seismic model (e.g., tau-p) is computed for each source, following, e.g., steps 300, 302, 304, 306, and 308 described above. Sparseness constraints can be used or not as appropriate; sparseness constraints can, e.g., be used with models for which the source emission signals are not completely orthogonal.

In place of Equation (7), Equation (12) relates seismic data d, source data S, and the model p for T sources, with the source index given by t:

$$d(f) = \sum_{r=0}^{R} \left[ e^{-2\pi i f r \Delta t} \sum_{t=1}^{T} \left\{ \sum_{m=1}^{M} S(r, m, t, f) p(m, t, f) e^{-2\pi i f h(r,t) s(m)} \right\} \right] \quad (12)$$

The formula sums the energy for each source. The dimensions of the various quantities can be as noted above; the limit T can be, e.g., from 2 to 10.

In Equation 0, S and p are functions of the source index t, since each source can emit a different seismic waveform. Position data h is also a function of the source index t, since the sources may not be co-located. Additionally, S is a function of model slowness m, as in Equation (7). Alternatively, S can be a function only of r, t, and f, analogously to Equation (6) but for each source t. In this example one model is used per source. In other examples, a model is used that satisfies more than one source (for example, two sources that traverse the same line). In the case a model satisfies more than one source, the sources may substantially be of the same bandwidth or of substantially different bandwidths. If the sources are sufficiently orthogonal, instead of simultaneously deriving one model per source, equation (7) can be solved repeatedly, e.g., once for each source. The multiple sources may substantially be at the same depth or at different depths. The sources may output substantially the same, overlapping, or different frequency ranges. The form of equation (12) may be modified to work directly with notional sources by substituting S for equation (9). In the case multiple source models have been derived, they may be combined in the reverse transform process. This means we may derive models for two or more sources, but may combine the energy relating to at least two sources as part of this process. This may be of use when the two or more sources are spatially very close to each other.

Using Equation 0 and other data processing techniques described herein for continuous sources also permits simultaneously shooting multiple continuous sources in close proximity. When the waveforms of those sources are orthogonal or pseudo-orthogonal, techniques described herein can be used to distinguish the energy from each source. Each source will have its own S(t, . . . ), so the summation in Equation 0 will correctly take into account the variations between sources when inverted to determine the model traces, p.

Specifically, in these embodiments, step 308 includes inverting the appropriate relationship, e.g., Equation 0, to provide a respective model p(t, . . . ) for each source t (e.g., in the tau-p domain). Step 310 can then include applying one or more of the models to determine the emulated-source data. For example, the models can be used to output conventional impulsive signal data for each source after designature, or to output data corresponding to a new signal, e.g., a ghost term or a wavelet relating to an earlier vintage of a time-lapse dataset. The impulsive shot data emulated from model p may be co-located for different sources, or may be at different locations. The sampling for each source may be the same, or may be different.

An example of the use of multiple sources to capture data is a single vessel operating one or more sources at single or multiple depths. A single source can be split into two parts (equivalent to sub-arrays), each with a different encoding. In still another example, a stationary non-impulsive or passive source can be operated and the receivers can be towed. This can be useful, e.g., for under-shooting. Using multiple sources and the data processing techniques described herein permits choosing from a wider range of source encodings and more effectively deblends signals corresponding to multiple sources.

Another example extends the previous theory to 3D where the model representative of the receiver domain Earth response represents a 3D area. The acquisition may relate to a single or multiple-vessel data-capture team, each vessel towing one or more sources with any spatial positioning at single or multiple depths. Various embodiments can be useful, for example, with 3D seismic surveys such as marine surveys in which the data are received by a network of OBN receivers in fixed positions arrayed over an area of the seafloor extending in two orthogonal dimensions.

The multiple sources can be vibratory sources on two survey vessels, whether operating independently or sailing in a coordinated manner (e.g., in parallel), and whether the signals are the same or different. Alternatively a mixture of source types can be used, e.g. one vessel with a vibratory source and another vessel with an airgun source.

In various embodiments, one model can be produced using the data from multiple sources. Instead of Equation 0, the following equation can be used to represent the relationship between seismic data, source data, location data, and the model:

$$d(f) = \sum_{r=0}^{R} \left[ e^{-2\pi i f r \Delta t} \sum_{t=1}^{T} \left\{ \sum_{m=1}^{M} S(r, \underline{m}, t, f) p(\underline{m}, f) e^{-2\pi i f \underline{h}(r,t) \underline{s}(\underline{m})} \right\} \right] \quad (13)$$

In Equation (13), there are T sources but only one model p. As above, t is the source index, r is the sample index, f is the frequency, and m is the slowness trace parameter or other angle-dependent term. The notation $\underline{m}$ in Equation (13) indicates that m is a vector, e.g., of length 2. Vector $\underline{m}$ indicates that instead of having a slowness in one direction, the model and source signature have slownesses in two dimensions, x and y. The function $\underline{h}$ thus returns a vector of length 2 indicating source-receiver offsets in the x and y directions. The multiplication of $\underline{hs}$ corresponds to $h_x s_x + h_y s_y$, i.e. offset-x multiplied by slowness-x plus offset-y multiplied by slowness-y. The resulting 3D tau-px-py representation of the data, p, may be used to output data anywhere in a 3D area specified by two orthogonal spatial coordinates.

Figure 7:
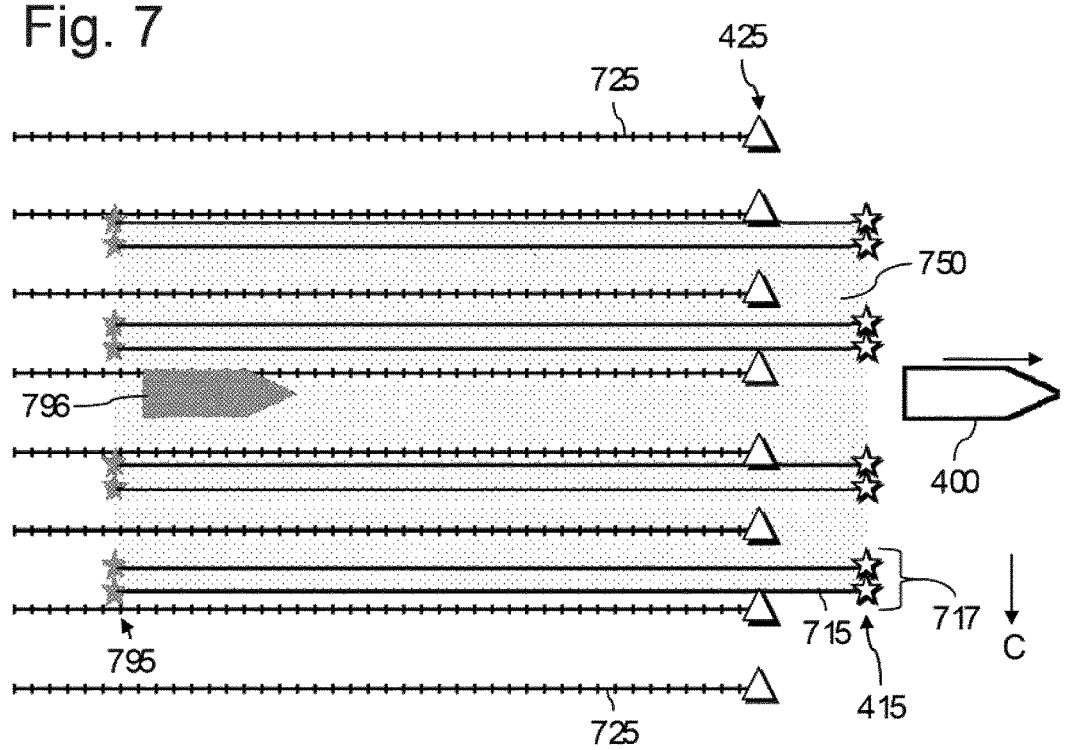
FIG. 7 shows a top view of an exemplary simultaneous shooting configuration for a marine seismic survey.

FIG. 7 shows a top view of an exemplary simultaneous-shooting configuration for a marine survey. The sources 415 are towed in pairs and follow paths 715 as the vessel 400 sails. Receivers 425 can be laid out on the seafloor as ocean-bottom cables (OBCs) or towed on streamers along paths 725. Each source 415 can have its own emission waveform (source data), e.g., orthogonal or pseudo-orthogonal with the waveforms of the other sources 415. The collected seismic data are processed as described above to provide output seismic data corresponding to impulsive firings for each source. The output seismic data for each pair of sources 415 are then used to compute a source wavefield gradient in the crossline direction C, for example by subtracting data relating to one source of a pair from data relating to the other source 415 of the pair. This gradient can then be used to interpolate hypothetical source positions anywhere along and perpendicular to the vessel motion direction, i.e., anywhere in area 750 for a selected time interval. Positions 796 and 795 show the positions of the vessel 400 and the sources 415 at the beginning of the time interval. Interpolation can be used, e.g., to reconstruct the source position of an earlier or later vintage of a time-lapse survey.

Cross-line pressure gradient interpolation can be performed according to techniques developed for cross-line receiver interpolation between streamers. Various aspects are useful with more than two sources at each location, or with individual source arrays where different elements of the array emit different signals. Source pairs 717 or arrays can be laid out along cross-line direction C, i.e., orthogonal to the vessel motion direction in this example, or along other directions.

Referring back to FIG. 3, when data from multiple sources are available, the seismic model can be used to provide output seismic data as if from a source located at a different position than any of the sources used to collect the data. In these embodiments, step 322 includes receiving emulated position data different from the respective position data of the moving source(s). The emulated position data indicate the position over time of a stationary or moving emulated source. The emulated position data are preferably confined, e.g., within the area 750 shown in FIG. 7.

In step 324, the second transform operator is then determined for the emulated source. In step 326, the determined second transform operator is applied as described above. The provided output seismic data thus correspond to the received emulated position data, which can be different from the positions of the real sources.

Figure 8A:
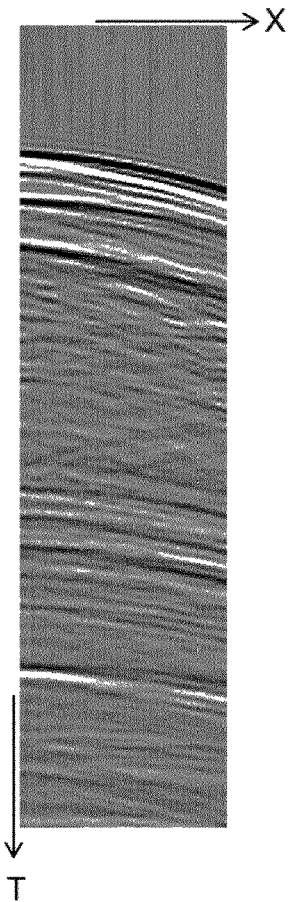
FIGS. 8A-8I are graphical representations of inputs and results of a simulation of techniques described herein according to various embodiments.
Figure 8D:
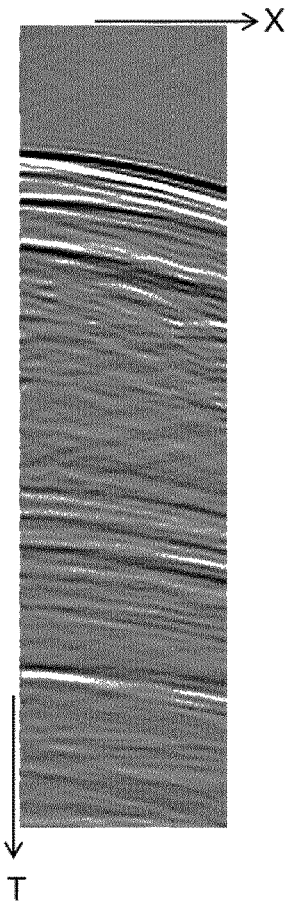
Figure 8E:
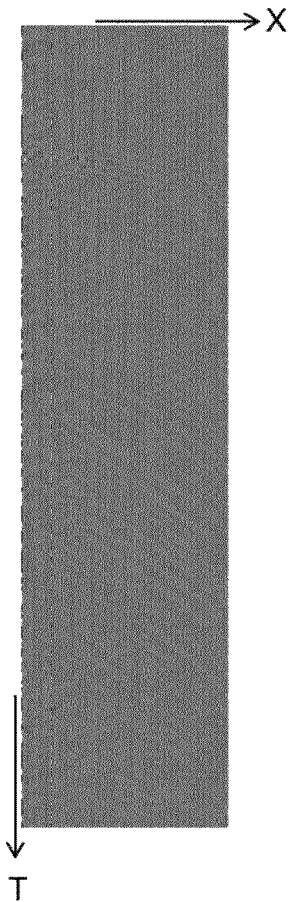
Figure 8B:
Figure 8C:

FIGS. 8A-8I are graphical representations of data used in a simulation of various embodiments, and results of that simulation. FIG. 8A shows an exemplary receiver gather representative of data from an impulsive source. FIG. 8B shows an exemplary random source signal. In this example, the source signal amplitude changes every 4 ms. FIG. 8C shows results of a simulation of what a single receiver would record if seismic energy corresponding to FIG. 8B were passed through a subsurface response corresponding to FIG. 8A. As can be seen, the seismic data in FIG. 8C do not show any features that self-evidently correspond to the responses shown in the receiver gather of FIG. 8A.

The exemplary source data of FIG. 8B (and corresponding position data) and the simulated seismic data of FIG. 8C were processed as described above (e.g., steps 306, 308) to determine a seismic model. Emulated-source data corresponding to the source data used to collect the gather in FIG. 8A were then applied to the model as described above (e.g., steps 320, 322, 324, 326) to determine output seismic data. FIG. 8D shows the output seismic data. As can be seen, FIG. 8D is very similar to FIG. 8A. Note that the data has been output based on a listening time, the data may alternatively be output on a continuous recording time. FIG. 8E shows the difference between the exemplary gather of FIG. 8A and the output seismic data of FIG. 8D; gray signifies no difference and black and white signify substantial difference. The data shown in FIG. 8E demonstrate that various embodiments described herein can advantageously determine seismic models and effectively provide output seismic data. For example, a source signal similar to that shown in FIG. 8B can be used in collecting seismic data, and a gather similar to that shown in FIG. 8D can be produced.

Output seismic data were also produced for an impulsive source using the same determined seismic model. The emulated-source data corresponded to a Dirac comb with a seven-second period (one impulse fired every seven seconds). For a vessel speed of 2.5 m/s, the 4 ms sampling corresponds to 10 mm travel, and the 7 s period of firing corresponds to 17.5 m in space. Each impulse in the emulated-source data takes a unique path through the Earth, given the travel of the source between shots. The seven second period was chosen as being long enough to substantially prevent interference between shots in the example configuration simulated.

Figures 8F, 8G:
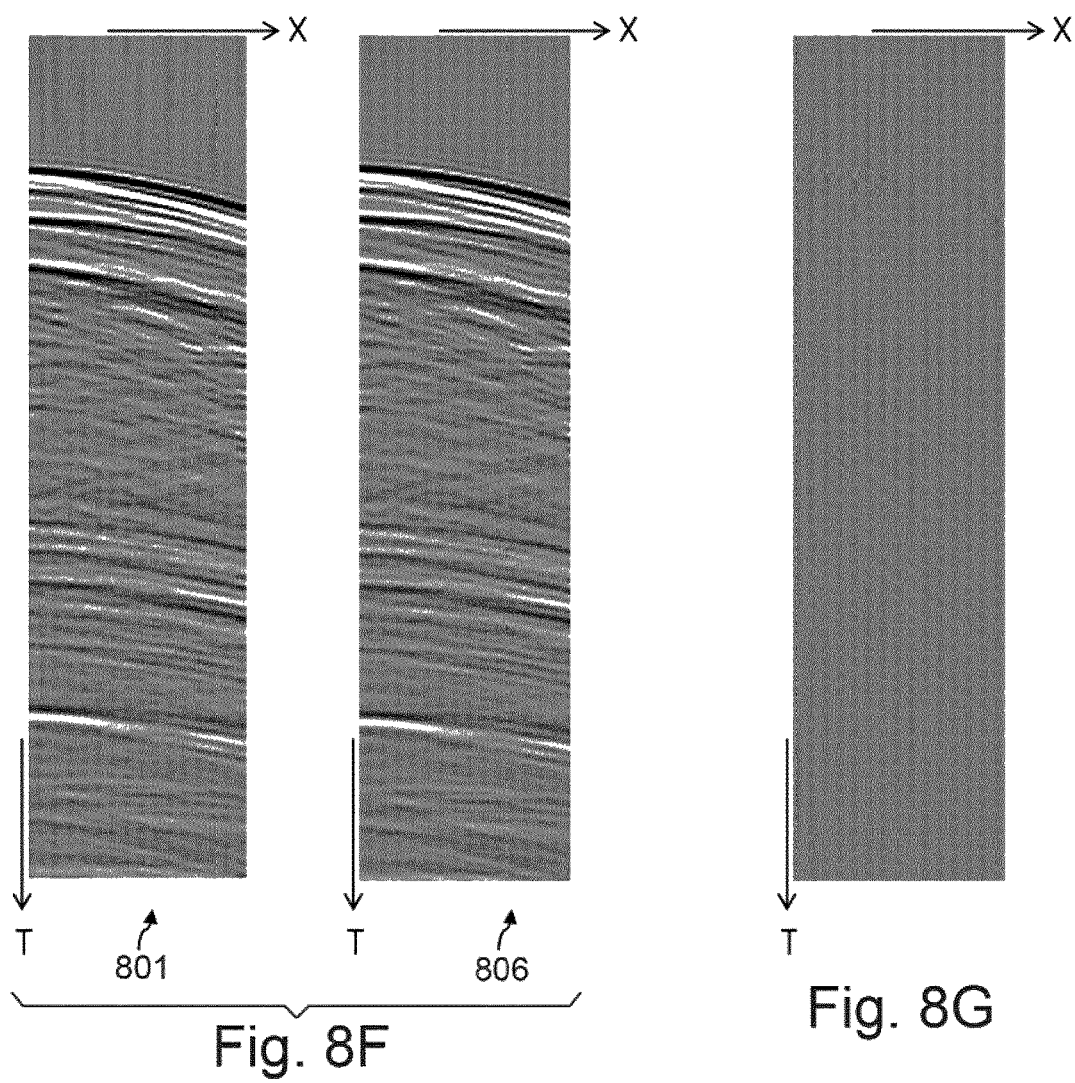

FIG. 8F shows a graphical representation of the output seismic data corresponding to the impulsive emulated-source data. Plot 801 is a reproduction of FIG. 8A and is provided for ease of comparison. Plot 806 is the output seismic data for the impulsive emulated seismic source. FIG. 8G shows the difference between the exemplary gather of FIG. 8A, plot 801 of FIG. 8F, and the output seismic data of plot 806, FIG. 8F.

Figure 8H:
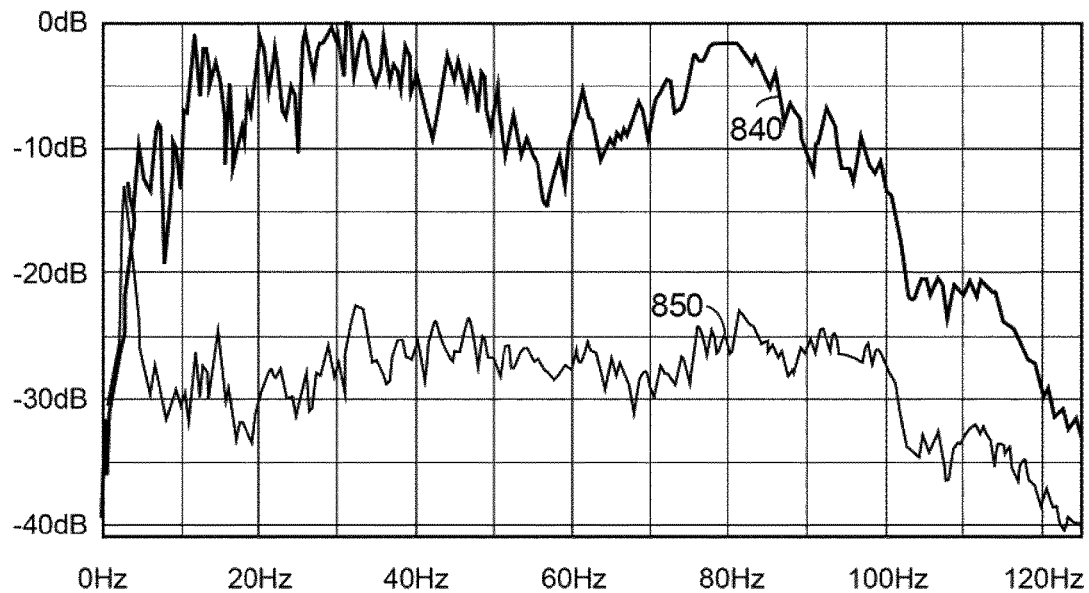
Figure 8I:
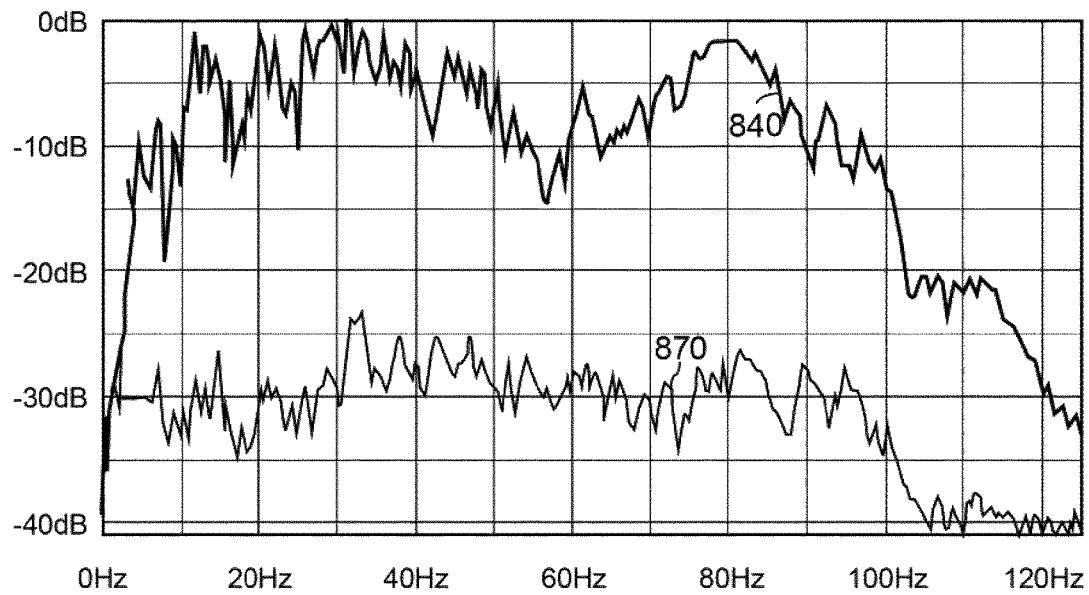

FIGS. 8H and 8I show graphical representations of spectral data for FIGS. 8D and 8F, respectively. FIG. 8H shows curve 840 representing the spectrum of the output seismic data shown in FIG. 8D. Curve 850 represents the difference shown in FIG. 8E between the output seismic data (FIG. 8D) and the original seismic data (FIG. 8A) as a function of frequency. Curve 840 represents the amplitude spectrum of the original receiver gather data (FIG. 8A) and the difference between the receiver gather data and the emulated receiver gather after simulation/correction. Each spectrum is the average of all traces in the gather. FIG. 8I shows curve 860 representing the spectrum of the output seismic data shown in FIG. 8F. Curve 870 represents the difference shown in FIG. 8G between the output seismic data (FIG. 8F) and the original seismic data (FIG. 8A) as a function of frequency.

The results show an effective reconstruction of the input data whether encoded with a 7 second impulsive source (FIG. 8F) or a continuous random emission (FIG. 8D). This is confirmed by the spectral analysis with differences ~20 to 25 dB down from the signal (curves 850, 870). The larger differences at low frequency (less than 5 Hz), e.g., shown in curve 850, relate to non-linear low frequency noise that was not modeled by the tau-p transform in this particular example. Such noise can be modeled by selecting the domain transform and transform parameters appropriately.

Figure 9:
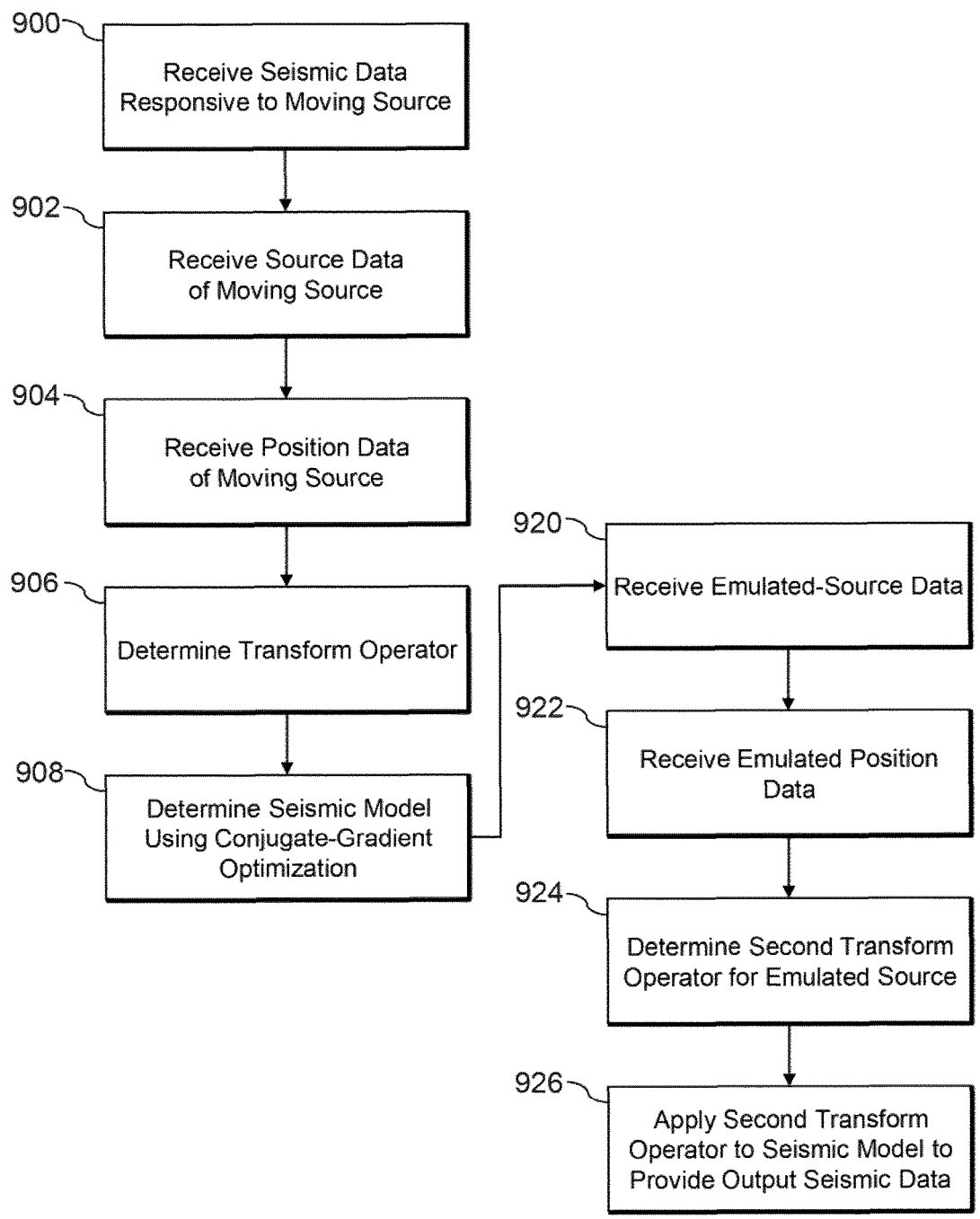
FIG. 9 is a flowchart of exemplary methods for providing a receiver gather using continuously-acquired seismic data.

FIG. 9 is a flowchart of a method for providing a receiver gather using continuously-acquired seismic data. According to an exemplary embodiment illustrated in FIG. 9, a step 900 includes receiving seismic data d recorded with a receiver (e.g., receiver 425, FIG. 4). The seismic data includes recordings (e.g., signal 420, FIG. 4) of Earth responses to seismic waves (e.g., signal 410, FIG. 4) generated by a moving continuous source (e.g., source 415, FIG. 4). This can be done as described above with reference to step 300, FIG. 3.

In step 902, source data S of the seismic waves generated by the moving source are received. This can be done as described above with reference to step 302, FIG. 3.

In step 904, position data h are received. This can be done as described above with reference to step 304, FIG. 3.

In step 906, a transform operator L is determined using the source data, the position data, and a selected domain-transform operator, e.g., a tau-p transform. This can be done as described above with reference to step 306, FIG. 3. In some aspects, as described above, transform operator L is not computed separately but instead is applied as a collection of smaller linear operations such as Equation (3).

In step 908, a seismic model is determined by mathematically optimizing a relationship between the transform and the seismic data using conjugate gradients. This can be done as described above with reference to step 308, FIG. 3. In an example, the seismic model is a tau-p model. As discussed above, the position data can be one-, two-, or three-dimensional. Accordingly, the tau-p model can be a two-, three, or four-dimensional model (intercept time vs. one, two, or three dimensions of slowness).

In step 920, emulated-source data are received. The emulated-source data indicate emission as a function of emission index and frequency. This can be done as described above with reference to step 320, FIG. 3. The emulated-source data describe the output source for which seismic data is desired or required. In the example of FIG. 4A, discussed above, seismic source 415 produces continuous signal 410. The emulated-source data in this example can be data representing the output of an impulsive source such as an airgun. Step 920 can be followed by step 924 or, in various aspects, step 922.

In step 922, emulated position data are received. These data represent the position of the emulated source as a function of time. Continuing the example above, the emulated impulsive source can be considered to be stationary or moving.

In step 924, a second transform operator is determined using the emulated-source data and the domain-transform operator. This can be done as described above with reference to step 322, FIG. 3. In aspects using step 922, the second transform operator can be determined further using the emulated position data as discussed above.

In step 926, the determined second transform operator is applied to the determined seismic model to provide output seismic data corresponding to the received emulated-source data. This can be done as described above with reference to step 324, FIG. 3.

Figure 10:
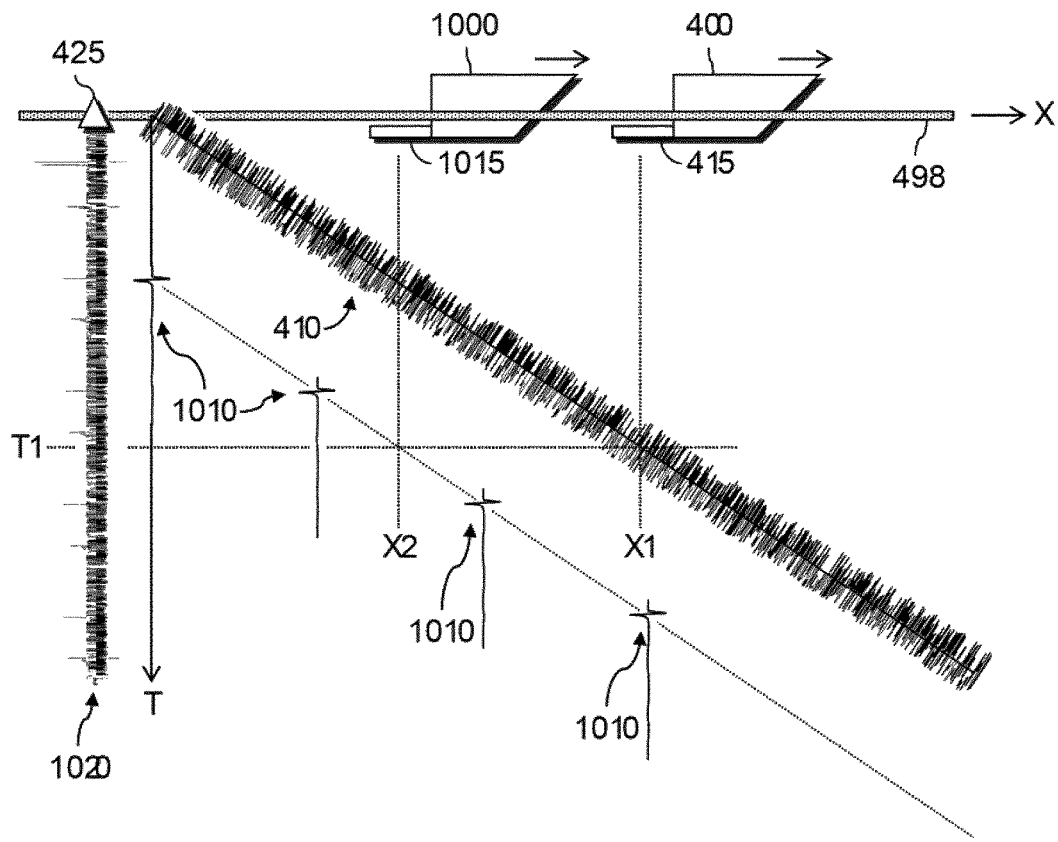
FIG. 10 is a graphical representation of operation of multiple marine sources and corresponding seismic data according to an exemplary embodiment.

In this example, as in other examples discussed above with reference to Equation 0, multiple sources can be used. FIG. 10 is a graphical representation of operation of multiple marine sources and corresponding seismic data according to an exemplary embodiment. The axes and the sea surface 498 are as in FIG. 4A. As shown, a continuous source 415, e.g. towed by a vessel 400, provides a continuous signal 410. An impulsive source 1015, e.g. towed by a vessel 1000 or by the vessel 400, provides periodic impulsive-noise signals 1010. Signal 1020 received by the receiver 425 includes seismic energy responsive to both the continuous signal 410 and the impulsive-noise signals 1010. In this example, the sources 415, 1015 move at the same speed, as indicated by the diagonal lines. At time T1, for example, the source 415 is at position X1 and the source 1015 is at position X2. The seismic data in signal 1020 are correlated with the response of different physical locations on the subsurface, since the positions of the sources are different. The h(r,t) term in Equation 0 is used to account for this effect. For example, h(T1, Source 415)=X1 and h(T1, Source 1015)=X2. Steps 902 and 904, FIG. 9, can include receiving respective source data and motion data for each of a plurality of sources, e.g., the sources 415, 1015.

Figure 11:
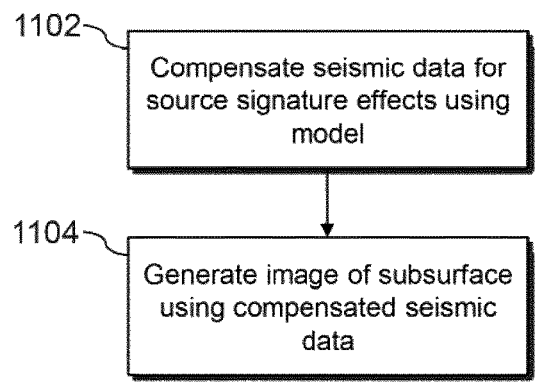
FIG. 11 is a flowchart of a method for generating an image of a subsurface of a geographical area using seismic data.

FIG. 11 is a flowchart of a method for generating an image of a subsurface of a geographical area using seismic data. According to an exemplary embodiment illustrated in FIG. 10, a step 1102 includes compensating the seismic data for source signature effects using a model which assumes that a source used to generate seismic waves associated with the seismic data is a moving, non-impulsive source. This can be done, e.g., as described above with reference to steps 900, 902, 904, 906, 908, 920, 922, 924, and 926 shown in FIG. 9. This can be done for stationary or moving receivers.

A step 1104 then includes generating the image of the subsurface using the compensated seismic data. This can be done by presenting the output seismic data graphically using known techniques, e.g., coloring positive amplitudes of a seismic wave dark and negative amplitudes light on a gather. Other techniques, including, e.g., normal moveout (NMO) compensation, migration, or common midpoint (CMP) stacking, can be applied to the compensated seismic data to generate the image of the subsurface.

The above methods and others may be implemented in a computing system specifically configured to calculate the image of the subsurface. An example of a representative computing system capable of carrying out operations in accordance with the exemplary embodiments is illustrated in FIG. 11. Hardware, firmware, software or a combination thereof may be used to perform the various steps and operations described herein.

Figure 12:
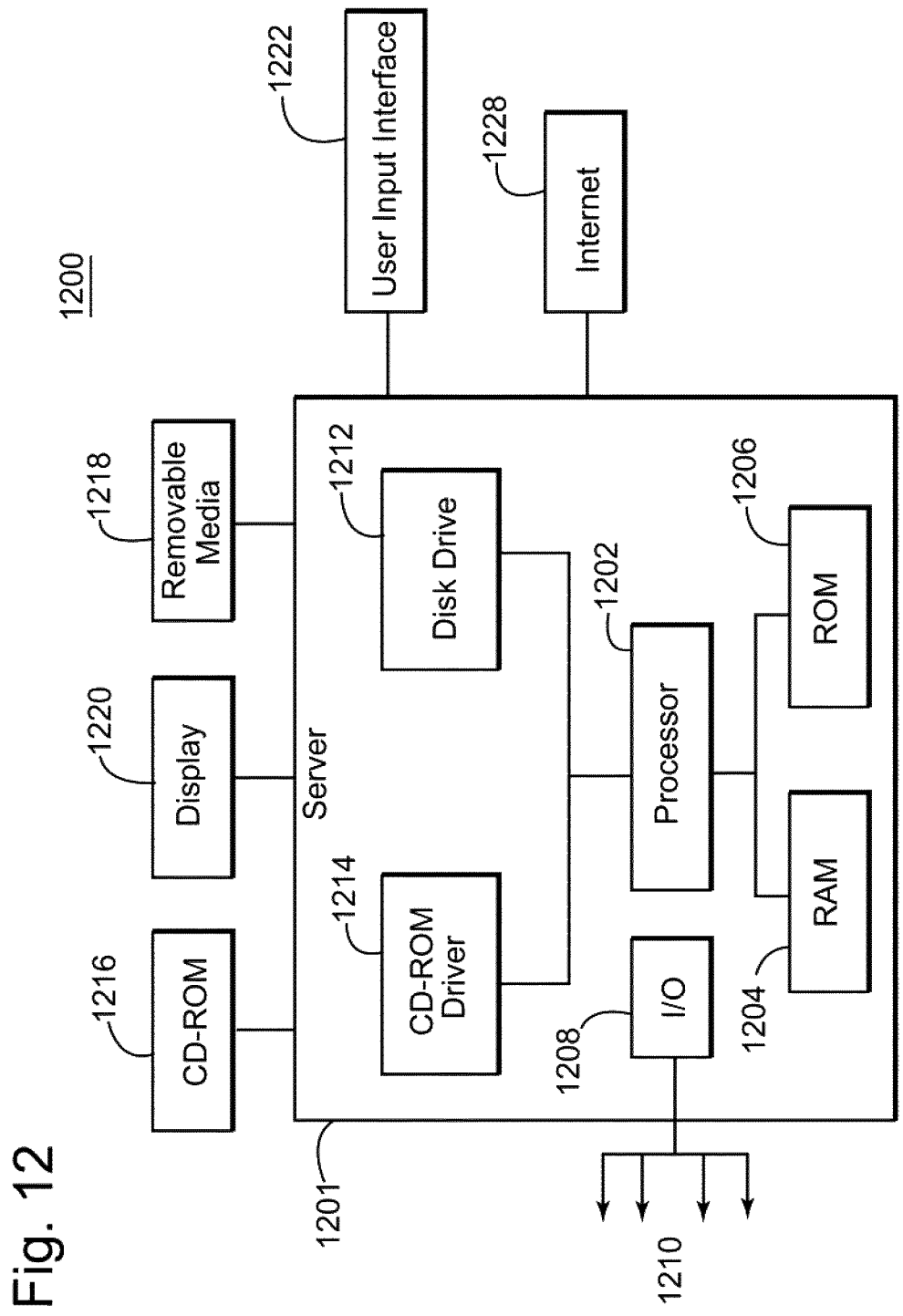
FIG. 12 shows an exemplary computing system suitable for performing the activities described in the exemplary embodiments.

FIG. 12 shows an exemplary computing system 1200 suitable for performing the activities described in the exemplary embodiments. The system 1200 may include a server 1201. Such a server 1201 may include a processor (e.g., a CPU or microcontroller) 1202 coupled to a random access memory (RAM) 1204 and to a read-only memory (ROM) 1206. The ROM 1206 may also be other types of storage media to store programs, such as programmable ROM (PROM), erasable PROM (EPROM), or Flash. The processor 1202 may communicate with other internal and external components through input/output (I/O) circuitry 1208 and bussing 1210, to provide control signals and the like. The processor 1202 carries out a variety of functions as are known in the art, as dictated by software or firmware instructions. The processor 1202 can also be implemented entirely in hardware, e.g., on an ASIC, or in programmable logic, e.g., on an FPGA, PLD, PLA, PAL, or CPLD.

The server 1201 may also include one or more data storage devices, including a disk drive 1212 (e.g., a hard drive), CD-ROM drives 1214, and other hardware capable of reading or storing information such as DVD, etc. In one embodiment, software for carrying out the above-discussed steps may be stored and distributed on a CD- or DVD-ROM 1216, removable memory device 1218 or other tangible, non-transitory computer-readable storage medium capable of portably storing information. These storage media may be inserted into, and read by, devices such as the CD-ROM drive 1214 or the disk drive 1212. The server 1201 may be coupled to a display 1220, which may be any type of known display or presentation screen, such as LCD, LED displays, plasma displays, cathode ray tubes (CRT), etc. A user input interface 1222 can be provided, including one or more user interface mechanisms such as a mouse, keyboard, microphone, touchpad, touch screen, voice-recognition system, etc.

The server 1201 may be coupled to other computing devices or systems, such as landline or wireless terminals, via a network. The server may be part of a larger network configuration as in a global area network such as the Internet 1228, which permits connection to various landline or mobile client devices. The network may include a satellite telephone link or shortwave radio link. The computing system 1200 may be implemented on a vessel that performs a marine seismic survey.

Examples of marine sources useful with various embodiments includes air guns, pingers, sparkers, or boomers fired with synchronized or de-synchronized timing, whether fired in a random or optimized non-synchronized pattern as the vessel sails, or fired on a regular spacing or timing, but with the airguns firing with a pre-defined random or optimized timing (the same timing for every location); a pre-defined random or optimized timing (different timing for every location); or random timing for every location. Other examples include land or marine vibrator sources, whether emitting energy continuously, e.g., in random signals or signals optimized for a given bandwidth or for a given target or model domain, or emitting energy in bursts, for example chirps, mono-frequency or sweeps (e.g. linear, pseudo-random, step sweep, or non-linear sweeps, sweeps low to high or high to low). Stationary vibrators, e.g. installed on the sea bed, attached to a rig or other stationary man made structure, can also be used. Vibratory sources can be configured so the travel path at the start of the sweep is approximately the same as at the end of the sweep. The source can include an airgun array and/or a marine vibrator array. Sources can emit seismic energy that has both an impulsive and a continuous component, in any combination (e.g., short bursts of random-vibration signals, or airgun shots during a continuous emission).

Such sources can also be used in combination. In various examples, de-synchronized airguns are used together with marine vibroseis; these techniques are complementary low-amplitude continuous-emission strategies. Moreover, the hydrodynamic noise of the vessel itself can be characterized and used as an additional (low frequency) source. In general, any seismic source type emitting energy as it moves can be used, whether in the context of land, marine, or a combination thereof (e.g., transition zone).

Various embodiments described herein are useful with any type of acoustic or elastic wave receiving equipment. Exemplary receivers include hydrophones or other pressure sensors, e.g., differential sensors, or geophones, velocity sensors, or accelerometers, which sense particle motion. Some receivers include sensors of more than one of these types. Various data-processing techniques described herein can also be used for non-acoustic emission, e.g., to process data from and electromagnetic or magnetic survey.

Various embodiments described herein receive data emitted by one or more non-impulsive marine source(s). A source emission function is received, whether vertical or a function of source takeoff angle. A receiver response function can be received, and can be vertical or a function of the receiver wavefield incidence angle. A mathematical model of the data can then be derived. The model can describe the wavefield variation with source and receiver position, and can correct for variations in source position or source emission. The model can then be used to output data representative of stationary-source, stationary-receiver seismic data. In various embodiments, the receiver response is left in the data to be corrected at a later stage in processing if necessary. If the source function outputs as bursts of energy during which the source may be considered stationary, a source motion correction can be omitted.

The aforementioned embodiments relate to recordings by a stationary receiver. In the case moving receivers are used during the acquisition, the recorded data may be pre-processed to simulate stationary receiver data before calling the embodiments detailed herein. The pre-processing may include receiver motion correction which may relate to a time variant spatial shift. The spatial shift may be implemented through sinc interpolation, Fourier interpolation, or another interpolation scheme. Alternatively source motion correction can be applied followed by receiver motion correction. Various embodiments associated with moving, non-impulsive sources and moving receivers will now be discussed.

Firstly consider the case of impulsive data handling source and receiver sides at the same time. In 2D we can consider a number of source positions and a number of receiver positions:
$n_s$—Source index, maximum $N_s$.
$n_r$—Receiver index, maximum $N_r$.
$x_s(n_s)$—Source x-coordinate
$x_r(n_r)$—Receiver x-coordinate
For each source position there will be a range of receiver positions. Now consider a model domain:
u—Model domain source-slowness index, maximum U.
v—Model domain receiver-slowness index, maximum V.
$s_s(u)$—Source direction model slowness, s/m
$s_r(v)$—Receiver direction model slowness, s/m
p(u,v,f)—Tau-p model for frequency f.
This notation doesn't relate to simultaneous shooting, merely the equations to generate data for a given source and receiver position from the model.
The following equation details how data would be constructed from the tau-p domain:

$$d(n_s, n_r) = \sum_u \sum_v e^{-2\pi i f \tau} p(u, v, f)$$

Where:

$\tau = s_s(u)x_s(n_s) + s_r(v)x_r(n_r)$

Figure 13G:
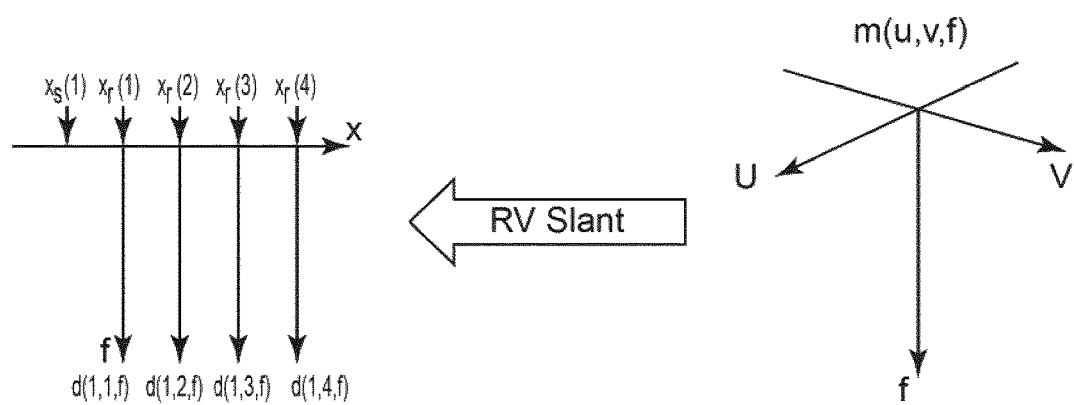
FIG. 13G illustrates how the reverse slant of the model may be used to generate traces at the location of any source-receiver pair according to an embodiment.

Based on the impulsive source firing time the above equation may be used to generate data at any source/receiver positions within from a tau-$p_s$-$p_r$ model. FIG. 13(g) illustrates how the reverse transform of the model is used to generate four traces relating to one shot. The model may be used to output data indicative of an impulsive source at any position.

We may now add to this formulation the case where we have source directivity (e.g. including array response and ghost as required):
S(u,$n_s$,f)—Source emission, function of take-off angle and varies from shot-to-shot $$d(n_s, n_r) = \sum_u \sum_v S(u, n_s, f) e^{-2\pi i f \tau} p(u, v, f)$$

Multiplication by S in the frequency domain equates to a convolution of the data with a directional re-signature operation.

In addition, we may add the receiver recording response. This includes the directional re-ghosting operation, for example as described in U.S. Patent Publication No. 20130163376, the disclosure of which is incorporated here by reference. FIG. 22A shows a receiver response function relating to a point receiver. The initial positive impulse 2201 relates to up-going energy, the following negative impulse 2202 relates to the free surface ghost. The ghost delay is seen to decrease with incoming angle. FIG. 22B shows the data in FIG. 22A in the f-x domain, the ghost notch at zero-slowness (2104) observed at 75 Hz moves to higher frequencies with increasing slowness magnitude.
R(v,$n_r$,f)—Receiver directivity response, function of take-off angle and varies from receiver to receiver (for example with receiver depth (ghost delay)).

$$d(n_s,n_r) = \Sigma_u \Sigma_v R(v,n_r,f) S(u,n_s,f) e^{-2\pi i f \tau} p(u,v,f) \quad (14)$$

Instead of having a single tau-$p_{shot}$-$p_{receiver}$ model for the whole line, it may be necessary to have many models each covering a limited range of x-coordinates. Each of the models reverse transforms to a given spatial area, each of which are combined using spatial tapering to cover the whole line. The use of many smaller model domains may allow for improved sparseness or high resolution weighting as each model will cover a small spatial area in which the data may be presumed to be linear or almost linear. This comment relates to the whole of this document. Other models may also be used as discussed previously.

Figure 14:
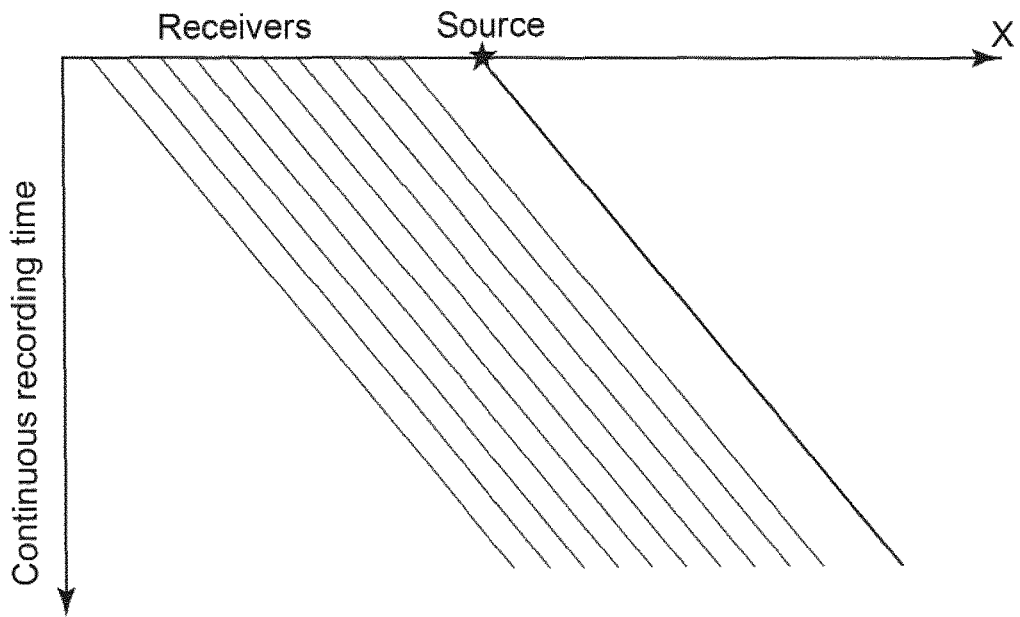
FIGS. 14-17 illustrate various aspects of moving sources and moving receivers according to embodiments.

Additional embodiments now consider further the case of sources and receivers moving continuously which is conceptually illustrated in FIG. 14. The notation below is modified relative to the afore-described notation to consider a time-domain implementation for simplicity. However, those skilled in the art will appreciate that equivalent notations in the frequency domain may be made. In the following embodiments there are $n_s$ sources firing simultaneously or substantially simultaneously. The following notation is based on a 2D positioning where we have a 3D model space (time, shot-x, and receiver-x). The principles may be extended to a so called 2.5D positioning where either the shot or receiver side becomes 3D. In this case the model domain would become 4D (e.g. time, shot-x, receiver-x, and receiver-y). Alternatively a full 3D implementation would result in a 5D model space (time, shot-x, shot-y, receiver-x, and receiver-y). Other 3D definitions may be considered, e.g. time, midpoint-x, midpoint-y, offset-x, and offset-y or time, midpoint-x, midpoint-y, offset, and azimuth. While the following is described for the applications of directional designature, directional receiver compensation and deblending, it should be noted that the formulation may be downgraded to the case directional designature, directional receiver compensation and/or deblending is not required.

New Notation
  Continuous emission/recording timing
  $\Delta t$—Continuous recording sample rate, seconds.
  c—Continuous recording sample number, max C.
  $n_s$—Source index/number of sources.
  $n_r$—Receiver index/number of receivers.
  u—Source direction model parameter.
  v—Receiver direction model parameter.
  $\tau$—Zero offset listening time, seconds.

Modified Notation
  Position terms, now a function of the continuous recording sample.
  $x_s(n_s,c)$—Source coordinates as a function of recording time
  $x_r(n_r,c)$—Receiver coordinates as a function of recording time
  Model domain:
  $p(u,v,T)$—Tau-p model.
  Source emission function:
  $S(u,\tau,c,n_s)$—Source emission. Varies with slowness and continuous recording sample number as well as from source-to-source.
  Receiver response function:
  $R(v,\tau,c,n_r)$—Receiver response. Varies with slowness and continuous recording sample number as well as for receiver-to-receiver.

Figure 15:
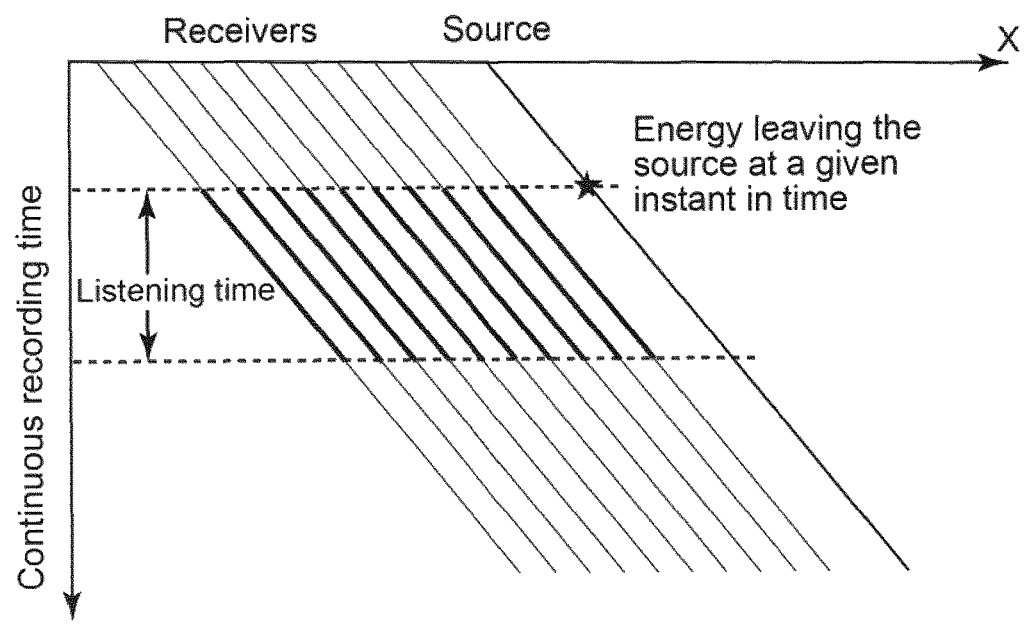

Further, these embodiments also contemplate a listening time as the time taken for the energy of all source generated reflection energy to be reduced to a negligible amplitude level using the following notation.
  l—Listening time sample number.
  L—Listening time maximum sample index, range 0 to L.
  The concept of listening time is illustrated in FIG. 15 which shows how the energy leaving the source at a given instant will contribute to the receivers within the listening time.

In a similar way to the previous embodiments, the processing of received seismic data generated using non-impulsive, moving sources and moving receivers can be treated as if it was generated via a continuous stream of directional energy leaving the source(s). This includes the net source array response as well as the ghost. The energy continuously takes differing travel paths through the Earth and interferes before being recorded at the receivers. Accordingly, this embodiment may consider the linear function from model space to a continuous recording receiver using the following processing steps:

The process can include a number of nested loops, e.g., loop through receivers, $n_r$, loop through each source $n_s$ for each receiver, loop through each source emission sample for each source. For the latter nested loop then the following processing can be performed.

Loop through receivers, $n_r$
  Source loop, $n_s$
    Source emission sample loop, c
      Listening time loop, l; range 0 to L
        Calculate receiver position for current listening time:

$$x_r^l = x_r(n_r,c+l)$$

Loop source direction slowness, u
        Loop receiver direction slowness, v
        Convolve model slowness trace with current receiver directivity response, $R(v,\tau,c,l,n_r)$.
        Convolve slowness trace with current source directivity, $S(u,t,c,n_s)$.
        Calculate reverse slant time shift:

$$\Delta T = s_s(u)x_s(n_s,c) + s_r(c)x_r^l$$

Interpolate sample from relevant trace from slowness trace based on $\Delta T$
        Add interpolated sample in to continuous recording trace, $d(c+l,n_r)$ The foregoing flow of linear operations may be used as a linear inversion process as discussed in previous embodiments, for example using conjugate gradients. The unknown model(s), $p(u,v,\tau)$ are found such that when the above linear operations are applied the known continuous recording data is reconstructed. Certain dimensions of some of the variables may be redundant, for example if there is only one source or if the receiver directivity is constant.

As discussed before, it may be useful to have a number of small tau-$p_s$-$p_r$ models to cover the data rather than one large model domain. This will limit edge effects and allow improved high resolution/sparseness. When considering any individual block, the coordinates may be relative to the block centre. The procedure of combining the result from all blocks may be combined into a multi-block inversion procedure including spatial tapering as necessary. The performing multi-block processing in this way is detailed, for example, in U.S. Pat. No. 8,675,447, the disclosure of which is incorporated here by reference.

Instead of applying a combined correction for receiver motion and moving non-impulsive source designature or receiver motion correction followed by moving non-impulsive source compensation, it is also possible to apply moving source compensation followed by receiver motion correction. This process would first compensate for the moving non-impulsive source signature and motion whilst respecting the continuously changing receiver positions. Following the non-impulsive source designature, the receiver motion correction may be applied as a separate step. Thus, the data processing associated with the previous embodiment can, alternatively, be modified to address the potential of aliasing in the data by breaking the processing into two steps which sequentially address source motion compensation and then receiver motion compensation as follows:

1) Data Simulation on to a Dense Virtual Receiver Grid:
  $n_r^{dense}$—Number of dense receivers
  $x_r^{dense}(n_r^{dense})$—positions of dense receivers
  $d_r^{dense}(c,n_r^{dense})$—Data at the dense receiver positions The virtual receiver grid represents stationary receiver positions where the energy leaving the sources is evaluated before the receiver motion (step 2) step is applied. The receivers for the dense grid should be positioned densely enough that, for the maximum dip and frequency of interest, the data is not spatially aliased.

2) Data Reconstruction/Receiver Motion Correction on to the Actual Receiver Positions:

Input: $d_r^{dense}(c, n_r^{dense})$ at $x_r^{dense}(n_r^{dense})$

Output: $d_r(c, n_r)$ at $x_r(n_r, c)$

The steps are further outlined below:

1) Data Simulation on a Dense Virtual Receiver Grid:

This step transforms tau-$p_s$-$p_r$ data to stationary densely sampled receiver continuous recording records.

Source loop, $n_s$
        Source emission sample loop, c
            Listening time loop, l; range 0 to L
                Loop dense virtual receivers, $n_r^{dense}$
                    Loop source direction slowness, u
                    Loop receiver direction slowness, v
                    Convolve slowness trace with current receiver directivity response, $R(v, \tau, c+l, n_r)$.
                    Convolve slowness trace with current source directivity, $S(u, \tau, c, n_s)$.
                    Calculate reverse slant time shift:

$$\Delta T = s_s(u) x_s(n_s, c) + s_r(v) x_r^{dense}$$

Figure 16:
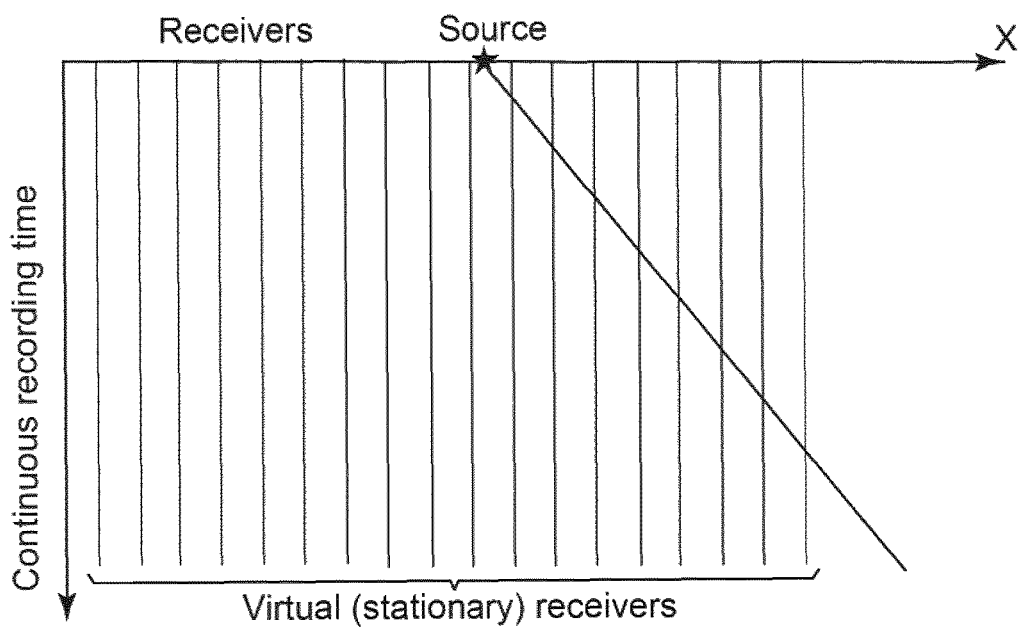
Figure 17:
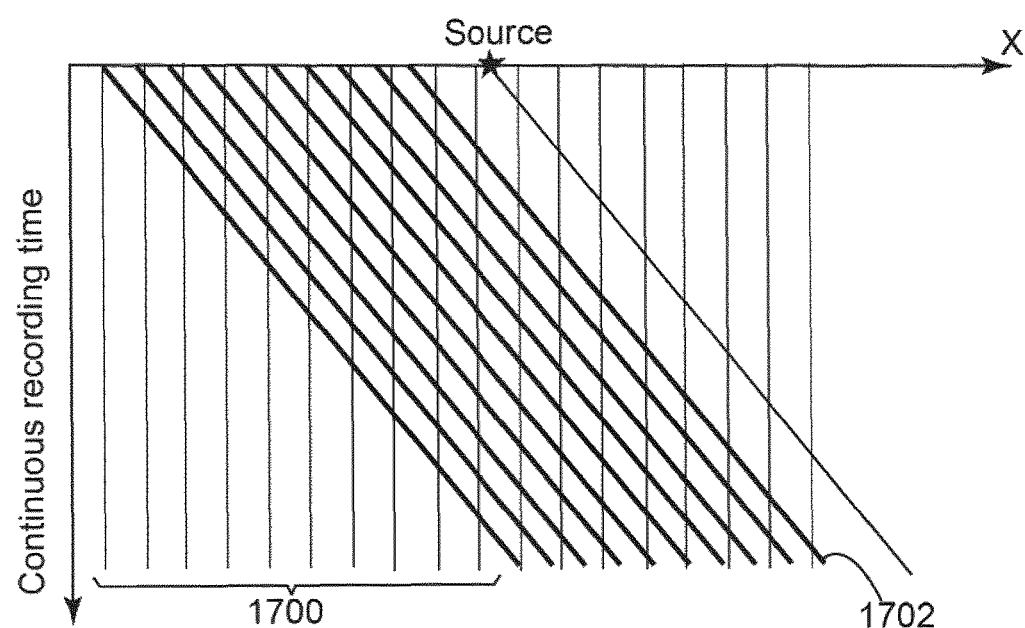

Interpolate the sample from relevant trace from slowness trace based on $\Delta T$
                    Add in to continuous recording trace, $d(c+l, n_r)$ 2) Receiver Motion/Reconstruction At this point we have recordings at dense virtual receiver positions. We may apply the receiver motion correction/trace reconstruction as a second step:

Source emission sample loop, c
        Loop through output receivers, $n_r$
            Calculate required spatial position for current receiver, $x_r(n_r, c)$
            Use sinc interpolation, Fourier reconstruction, or another interpolation using the dense data, $n_r^{dense}$, to interpolate the output data sample Steps 1 and 2 above are illustrated conceptually in FIGS. 16 and 17, respectively. Therein, FIG. 16 depicts how step 1 above derives the recorded energy into virtual receiver positions, and FIG. 17 then shows how in step 2 above the spatial interpolation maps the virtual receivers, e.g., represented by straight lines 1700, on to the position of the moving receivers, e.g., represented by the diagonal lines one of which is referenced by numeral 1702. Numerous variations and adaptations of these moving source/moving receiver embodiments are also contemplated. For example, instead of the output of step 1 being at hypothetical stationary receiver positions, they may be output in a model domain, e.g. in the k-t domain (wavenumber-continuous recording time). Some of the steps in this or earlier algorithms may be applied in different orders. According to some embodiments, conjugate gradients are used to solve these iterative functions, however other solvers may also be used. Sparseness constraints may be imposed on the solver as necessary. Other high resolution solver methodologies, for example using low frequencies to de-alias high frequencies or using high frequencies to constrain low frequencies, may be used.

The general concepts from the foregoing embodiments can, for example be summarized and expressed as follows according to another embodiment:

1. Receive data emitted by one or more non-impulsive marine source;
2. Receive source emission function (vertical or function of source takeoff angle);
3. Receive receiver response function (vertical or function of receiver wavefield incidence angle);
4. Derive a mathematical model of the data which describes the wavefield variation with source and receiver position, using at least one of the following corrections:
    a. Receiver motion correction;
    b. Source motion correction;
    c. Receiver response correction;
    d. Source emission correction
5. Use the model to output data representative of stationary source and/or receiver data Not all of these five steps may be required in a given implementation, for example the receiver response may be left in the data and corrected at a later stage in processing if necessary. The receiver motion correction may not be required, especially if the receiver was not moving during acquisition (e.g. ocean bottom cable or ocean bottom node acquisition). If the source function outputs bursts of energy during which the source may be considered stationary, a source motion correction may be omitted.

The seismic modelling schemes outlined herein may also be adapted to compensate for group array effects. The group effects may be on the source side as described earlier by the consideration of a number of source elements making up a seismic source. Source elements may relate to airgun arrays, land vibroseis arrays, marine vibrator arrays, or other arrays. The method may also be used to compensate for group array effects on the receiver side. This may be done in combination with all other aspects of the invention outlined in this document. This may include source ghost effects, receiver ghost effects, compensation for receiver motion, compensation for source motion, and combinations thereof. For the following we take the example of a marine streamer but the theory is also valid for other receiver types, e.g. OBN, OBC, land geophones, etc.

Consider the case of a marine streamer acquisition where a number of individual hydrophones are summed in analogue or digital before the data has been provided. The summation may relate to a straight summation without weighting, or by use of a weighting function, e.g. sinc or sinc-squared function. The summation process is generally designed to attenuate noise in the data, but will also modify the signal for all but energy travelling perpendicular to the array. In the case of a horizontal towed streamer this means that all but vertically travelling energy will be attenuated to a greater or lesser extent.

Figure 18:
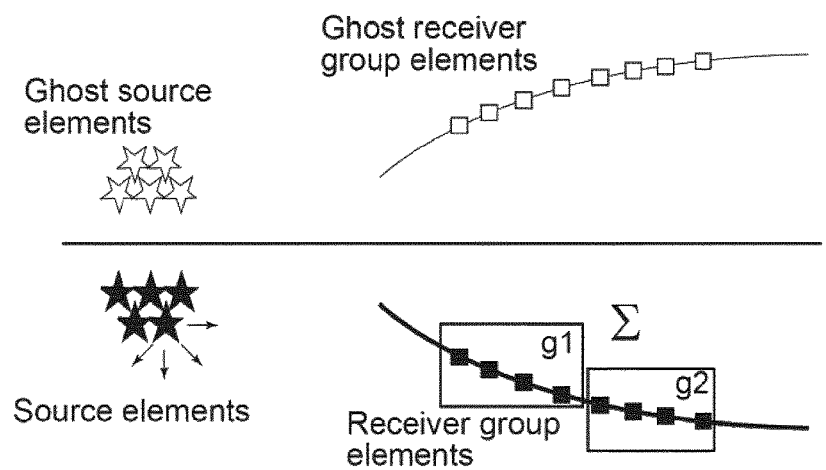
FIG. 18 depicts various aspects associated with receiver side and source side group effects that can be compensated by embodiments.

For example, FIG. 18 shows the layout for a towed streamer acquisition with five isotropic source elements and two receiver groups each composed of four receiver elements. Embodiments may consider that the energy from the source elements is combined when the source is excited, and that the energy in each of the two receiver groups is combined when the energy is summed in the group summation. The group summation process may occur in analogue or digitally. The group summation process may occur in the streamer itself or be transferred in either analogue or digital down the streamer and summed on the vessel or at a later date on shore. FIG. 18 also highlights ghost source and ghost receiver elements which may or may not also be included in the summation. If they are not included in the summation, the model of the data will still contain the free surface ghost. If they are included, the model will be free of free surface ghost effects as the linear equations being solved will re-ghost the data.

Based on the foregoing concepts, the modelling equations can be modified to respect the positions of the individual pre-group sensors based on their positions relative to the group center along with any weighting scheme used as follows:

$$d(n) = \sum_{n_r=1}^{N_r} \sum_{n_s=1}^{N_s} \sum_{m=1}^{M} L(n_r, n_s, m)p(m)$$

$$L(n_r, n_s, m) = f(n_s)r(n_r)\text{sign}(z_s(n_s))\text{sign}(z_r(n_r))e^{-2\pi i f \tau}$$

$$\tau = s_{rx}(m)x_r(n_r) + s_{ry}(m)y_r(n_r) + s_{rz}(m)z_r(n_r) + s_{sx}(m)x_s(n_s) + s_{sx}(m)Z_s(n_s)$$

$$\frac{1}{v_w^2} = s_x^2 + s_y^2 + s_z^2$$

where d(n) is the recorded data;
Nr is the point receiver within the group;
Ns is the source element within the group;
M is the model trace;
$f(n_s)$ is the source sig;
$r(n_r)$ is the receiver filter;
$\text{sign}(z_s(n_s))$ is the source ghost sign;
$\text{sign}(z_r(n_r))$ is the receiver ghost sign; and
$e^{-2\pi i f \tau}$ is the slant and redatum.

The above summation generalizes a linear process from model domain (e.g. tau-p domain) to data domain which includes reverse tau-p transform, and summation of source and receiver elements in the groups. The equations are formulated for a frequency slice, f, but may alternatively be formulated in the time domain. The operator L includes source signature, receiver filter (e.g. relating to the recording system and/or summation scalars), source signature ghost sign (depending on the sign of the source element depth (−ve depths relating to ghosts)), receiver ghost sign, source/receiver array effects, and the reverse slant stack. The time shift relating to the reverse slant process will depend on source/receiver element positions in (x,y,z) and the slowness $(s_x,s_y,s_z)$. The slowness in the z-direction is a function of the water velocity $(v_w)$ and slownesses in the x- and y-directions as shown. Slowness subscripts relate to slownesses in the source or receiver side. The process may be implemented in 2D, 2.5D, or 3D as described earlier. This formulation may be expanded to include the concepts of simultaneous shooting and moving sources and receivers as discussed previously.

Figure 23:
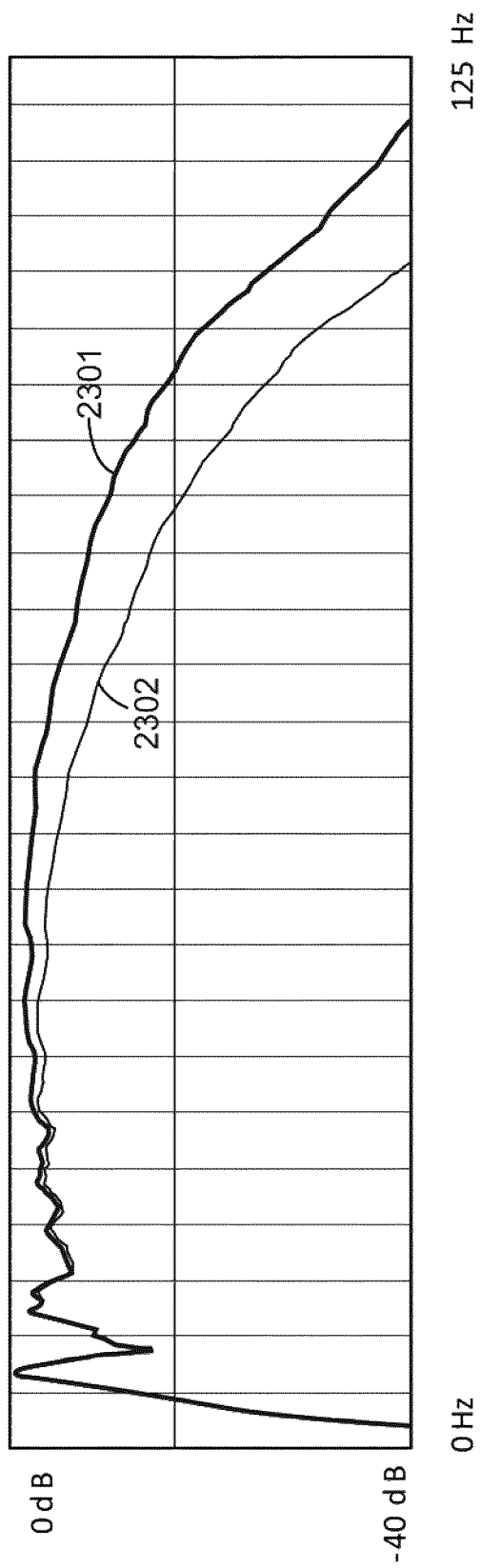
FIG. 23 depicts spectra relating to direct arrival energy travelling horizontally from the source to a receiver with a free surface ghost.

The significance of the group array effect is illustrated in FIG. 23. The spectra plotted on FIG. 23 relates to direct arrival energy travelling horizontally from the source to a receiver with free surface ghost. The higher dB spectrum (2301) curve relates to the spectrum from a single point receiver. The lower dB spectrum (2302) relates to a group response relating to the summation of eight point receivers in a similar configuration to those in a towed streamer. At low frequencies we can see the curves are very similar, at higher frequencies we see an attenuation of energy relating to the group summation.

The equation may be solved with conjugate gradients or other solver, and may be solved including data and/or model domain sparseness weights which may or may not be updated iteratively.

Once the model has been found, it will be at least partially free of source element signatures, source group effects and ghost as well as receiver group effects and ghost. The model may then be used to simulate data with modified signature, group effects, ghosts or combinations thereof. The modification may relate to returning directly the modified data, or outputting a dataset to be combined (e.g. added, subtracted, or convolved) with the original data to result in the desired modification. The modified group effect may relate to modified positions and/or number of elements forming the groups. This may be used to simulate data from another vintage of a time lapse survey or to improve the integrity of amplitude with angle/offset.

As mentioned previously, a simplified formulation may be used in the case all modifications are not required. In the case we only want to compensate for the receiver group effect and free surface ghost, the relevant equations would be:

$$d(n) = \sum_{n_r=1}^{N_r} \sum_{m=1}^{M} L(n_r, m)p(m)$$

Where: $L(n_r,m) = r(n_r)\text{sign}(z_r(n_r))e^{-2\pi i f \tau}$

Where: $\tau = s_{rx}(m)x_r(n_r) + s_{ry}(m)y_r(n_r) + s_{rz}(m)z_r(n_r)$

The resulting model space may be used to output data indicative of a modified group array with or without wavefield separation. As previously mentioned, a variety of model spaces may be used for solving any of the aforementioned inversion problems. An embodiment relating to the frequency-wavenumber domain is now discussed in more detail.

The joint source-receiver model space described in Equation 14 may be re-written in terms of a frequency-shot wavenumber-receiver wavenumber model space as below:

$$d(n_s, n_r, f) = \sum_{k_s} \sum_{k_r} R(k_r, n_r, f) S(k_s, n_s, f) e^{-2\pi i f b} m_{k_s,k_r}(k_s, k_r, f)$$

$$b = k_s x_s(n_s) + k_r x_r(n_r)$$

Source and receiver ghost/directivity functions may be calculated for the FK domain in a similar way to the tau-p approach as is well understood in the field. In this formulation, the position information in the equation for b should be pre-normalized to the range zero to one or centered on an individual processing blocks. As there is an exact relationship between the wavenumber and space domains (i.e. FFT followed by FFT$^{-1}$ results in no change to an input), the model domain may be instead defined in a spatial domain as follows.

$$d(n_s, n_r, f) = \sum_{k_s} \sum_{k_r} R(k_r, n_r, f) S(k_s, n_s, f) e^{-2\pi i f b} FFT2D_{x,r \to k_s,k_r}[m_{x,r}(x, r, f)]$$

In this case, the model relates to the Earth response as a function of frequency and space. Even in the case the model may be in the same domain as the input, it is still termed the model domain as it represents the unknown quantity in the inversion problem. Note that the model will normally relate to a listening time, and the data to a continuous recording time. A reverse temporal FFT would result in listening time related data. Alternatively the model may be derived directly in the time domain by including extra FFT operations to the equation.

Any of the embodiments described herein which include a receiver ghost may be adapted for the purpose of particle motion/velocity/acceleration sensors orientated in any direction. This adaptation may involve an obliquity correction and a change in polarity of the ghost (ghost energy is travelling downwards) as, for example, described in International Patent Application No. PCT/EP2014/058623, entitled "DEVICE AND METHOD FOR WAVEFIELD RECONSTRUCTION", filed on Apr. 28, 2014 and which claims priority from U.S. Provisional Patent Application No. 61/817,193, filed on Apr. 29, 2013, both of which are incorporated here by reference.

Any of the embodiments disclosed herein or combinations thereof may be adapted to compensate for any combination of the following effects with single (e.g. hydrophone, accelerometer, particle motion sensor, etc) or multi-component (i.e. combination of different sensor types) seismic recording systems.

Source signature compensation
   Source ghost compensation or up/down separation
   Source array compensation
   Source wavefield reconstruction in any direction in 3D space (i.e. x, y, z where z means a re-datum)
   Source motion compensation
   Source deblending
   Combining energy from different sources
   Receiver recording system compensation
   Receiver ghost compensation or up/down separation
   Receiver array compensation
   Receiver wavefield reconstruction in any direction in 3D space (i.e. x, y, z where z means a re-datum)
   Receiver motion compensation
   Synthesis of data indicative of one sensor type using data from another sensor type (e.g. creating vertical particle velocity data from hydrophone data)

As described in earlier embodiments, we may solve a least squares problem using a source signature and then use the model space with a modified signature to generate the output data. An alternative to this scheme may be to modify the original equations to directly derive a model space indicative of the desired output characteristics. For example, if the input data has signature a, and we require an output with signature b. The original formulation would solve the equations using signature a, and then create the output using signature b. In the alternative scheme we may solve the original equations using signature $ab^{-1}$, and then generate the output without using any signature. The same principle may be used for any other of the aforementioned modifications to the data, e.g. deghosting, array modification, etc.

Reconstructed data may be at the same positions as input data or at new positions. New positions may be in-between ocean bottom sensors or in-between streamers at the same or a modified depth. The number of output traces may be the same as the number of input traces. Alternatively the number of output traces may be different to the number of input traces, for example on a denser grid.

The model space relating to any of the aforementioned algorithms and equations may be processed before it is used to compensate the input data. The compensation may include denoising (for random or coherent noise), interference noise attenuation, or multiple-attenuation.

The term compensation in this context refers to a modification from the acquisition parameters. This means that embodiments can change the source signature from the acquired source signature to a desired source signature. Such embodiments can may remove the source ghost or encode a new source ghost based on a new datum. Alternatively we may remove the down-going source energy, thus retaining only the source ghost energy for further processing. The source array configuration may be modified from the acquired source array configuration to a point source or another array configuration. The source position may be reconstructed away from an initial source position. Source motion compensation may remove the effect of source motion entirely or reconstruct data with a new source motion. The receiver recording system compensation may correct for analogue, digital, or other higher order effects in the receiver recording system. The receiver ghost may be removed or constructed based on a new receiver depth. Alternatively, the up-going receiver energy may be removed, thus retaining only the receiver ghost for further processing. The receiver array response may be removed completely or modified to a new receiver array, for example from a straight summation to a spatial bandpass filter based approach equivalent to a wavenumber boxcar. Receivers may be output at new locations in space and depth. The receiver motion may also be modified or removed.

In addition, it may be desirable for some or all of the embodiments described above to employ some form of synchronization of the source emissions and receiver recordings. As described above, seismic acquisition systems consist of one or more source elements and one or more receivers configured to detect energy after transmission through the subsurface. For the purposes of these embodiments, consider that the sources and receivers are configured to emit and receive acoustic energy. An acoustic source may generally be defined as a source which emits sound energy. The energy leaving the source may subsequently travel as acoustic or elastic waves.

The following non-exhaustive and non-limiting list gives some examples of source elements currently or historically used for seismic exploration, also note that these sources may be used in combination:

Marine Sources (Both Impulsive and Non-impulsive)
   Airguns
   Pingers
   Boomers
   Sparkers
   Marine vibrators
   Sosie
Land Sources
   Dynamite
   Weight drop
   Accelerated weight
   Land airguns
   Minisosie
   Sledgehammers
   Projectiles (betsy)
   Land vibroseis Acquisition systems may position several acoustic source elements in close proximity to each other. In this case, the array (or group) of acoustic elements may be termed a 'source array'. The source elements forming a source array may be configured to emit acoustic energy synchronously (i.e. each acoustic element emits the same signal or fires at the same time). Alternatively, the acoustic elements may be configured to emit in a desynchronised way, for example instead of firing all airguns at the same time they may be fired over a period of time with regular or irregular timings. A system of desynchronised firing may be useful to reduce peak amplitude emission which can be attractive for environmental as well as other reasons. More than one source may fire at the same time, i.e. simultaneous shooting. While this document describes many embodiments relating to issues arising from non-stationary and non-impulsive data, it should be noted that the embodiments are also relevant for stationary and/or impulsive acquisition configurations.

A receiver system is normally configured to record acoustic energy after transmission through the subsurface. The receivers may be on land, on the sea bed (ocean bottom survey (OBS), nodes or cables), towed streamer, or combination thereof. The receivers may be configured to record the total (non-directional) wavefield (e.g hydrophone) or a component of the wavefield along a given sensor orientation (e.g. geophones or accelerometers). Some examples of acoustic receivers are given below; it should be noted that this is a non-exhaustive list and different sensors may be used in combination:

Geophones
Hydrophones
Accelerometers
Particle motion sensors
Particle velocity sensors
Differential pressure sensors The energy recorded at a receiver following a given source excitation will normally reduce in amplitude over time due to increasing travel paths and absorption in the earth. We may term the time taken for all useful energy relating to an impulsive source firing to be recorded as the 'listening time'. For this reason, data at the receivers is normally segmented into different traces (on the order of 4 seconds to 10 seconds in length), each recording the energy coming from a given source firing. An alternative scheme also in use is termed 'continuous recording'. With continuous recording the energy at the receivers is continuously detected and recorded, often still as trace segments but with no gap in recording. Continuous recording is very common in OBS acquisition (e.g. ocean bottom nodes) or for land acquisition. This scheme is particularly attractive with the use of non-impulsive sources, where it is not always possible to synchronize recording traces with shot excitation times, or when acquiring a simultaneous shooting survey.

With the trend to move to non-impulsive source types it is necessary to continuously monitor energy leaving the source. To a certain extent this principle is already used in land vibroseis acquisition where base plate measurements are routinely recorded and archived for many surveys. For land acquisition, more often we measure the weighted sum as an estimate of ground force. An accelerometer is installed on the reaction mass and an accelerometer on the base plate. A weighted sum is formed using the respective weights of the assemblies. The ground force is equivalent to the force applied at the baseplate/earth interface.

According to these embodiments, synchronized monitoring and archiving of source emission and receiver data are provided. This information may be used for source monitoring and update of the driving signal, but is also useful to archive for data processing.

Figure 19:
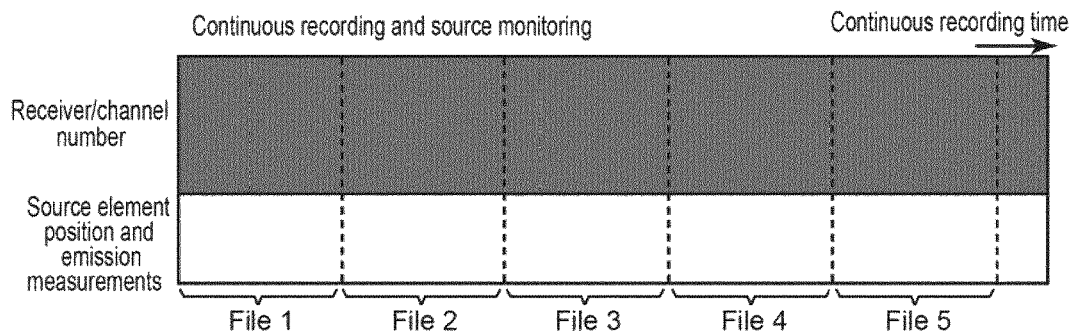
FIG. 19 shows recordings of synchronized continuous receiver recordings and seismic source emissions.

While much of the following discussion will relate to acquisition using marine vibrator arrays, the same strategy may be used for all seismic exploration systems equipped with continuous source monitoring and receiver recording systems. Examples of source monitoring equipment may include (but are not limited to):

Accelerometers positioned on marine vibrator elements
Vibroseis base plate measurements
Nearfield hydrophone recordings A typical marine towed streamer recording system may consist of several (often between 4 and 20) streamers each consisting of recording elements which may or may not be group formed (e.g. summed, either in analogue or digital) before archiving. The archiving strategy consists of collecting the recordings from all receivers for a given time interval and writing the records to an archive medium (e.g. optical disk, magnetic tape, hard drive, flash memory, etc) as a file. The file typically may contain several thousand trace segments each with a fixed duration in the order of 4000 ms to 10000 ms along with trace headers. In the case of continuous recording, the trace segments in successive files can be concatenated to form continuous recording data. For this embodiment, extra traces are added to the recording trace groups coming from source element monitoring as shown in FIG. 19. Thus, instead of the files just containing energy recorded at the receivers, according to this embodiment the files also contain synchronized source emission information. At any given instant in time this will archive the energy leaving each source element as well as what is being recorded at each receiver. The files may also, optionally, include the (x,y,z) position of each source and/or receiver.

Instead of recording the raw measurements (e.g. marine vibrator accelerometer recordings) it may be useful to instead record pre-processed measurements. For example, accelerometers being used may not be calibrated, so they may be recorded after calibration. The data may include information such as the temperature of the device, or other information recorded continuously. The data may be further processed, for example to calculate directional signatures which may be achieved instead or as well as measurements relating to each source element which can then be used as described above in the embodiments for source motion compensation. It may be necessary to modify the sample rate of the marine vibrator acceleration recordings to match that of the streamer, including anti-aliasing filtering as necessary. Alternatively, it may be necessary to have the source recordings at a different sample rate to the receiver recordings.

In the case that the sensors relating to each element are contaminated by other energy (e.g. from other elements or interference), it may be necessary to pre-process the recordings before archive. This could be as simple as frequency filtering, multi-trace filtering (e.g. FK or dip filtering to remove external noise). Another method may be the marine vibrator equivalent of the Ziolkowski (1982) method used traditionally for airgun arrays.

It can also be important to have an accurate timing of the recordings. An extra trace dedicated to the exact timing of the recording for each sample can also be of use. For example this could come from a GPS receiver, WWV receiver, cell phone, or internet link. In the case it is not necessary to have continuous timing information; a time stamp (e.g. header) for each file may be sufficient.

In the event of multi-vessel operation, the source element emission and/or receiver recordings from both vessels may be combined into a single dataset. This means that the files in the dataset in the previous figure may contain sources and channels towed by more than one vessel. This also covers the case when source elements are positioned as more than one source, i.e. simultaneous shooting.

Some disclosed exemplary embodiments provide systems and methods for compensating for source signature effects in seismic data, for providing a receiver gather using continuously-acquired seismic data, and for generating an image of a subsurface of a geographical area using seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description above, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method for generating an image of a subsurface of a geographical area using seismic data, the method comprising:
generating the image by compensating the seismic data for source signature effects using a model which assumes that a source used to generate seismic waves associated with the seismic data is a non-impulsive source that moves continuously while emitting the seismic waves.

2. The method of claim 1, further comprising:
receiving the seismic data recorded with at least one receiver, wherein the seismic data includes recordings of an Earth response to the seismic waves generated by the moving, non-impulsive source;
receiving source data related to the seismic waves generated by the moving, non-impulsive source;
receiving position data indicating position(s) of the source while generating the seismic waves; and
compensating for the source signature effects in the seismic data using also the source data and the position data.

3. The method of claim 2, wherein the position data is received for the receiver while recording the seismic data.

4. The method of claim 2, wherein the at least one receiver is stationary.

5. The method of claim 2, wherein the at least one receiver is moving and the seismic data recorded by the at least one moving receiver has been corrected for receiver motion.

6. The method of claim 2, further comprising source separation or deblending of the seismic data.

7. The method according to claim 2, further including:
determining a transform operator using the source data, the position data, and a selected domain-transform operator; and
determining the model by mathematically optimizing a relationship between the transform and the seismic data.

8. The method of claim 7, wherein the compensating includes:
receiving emulated-source data;
determining a second transform operator using the emulated-source data and the domain-transform operator; and
applying the determined second transform operator to the determined model to provide output seismic data corresponding to the received emulated-source data.

9. The method of claim 8, wherein the compensating further includes:
receiving emulated position data; and
determining the second transform operator further using the emulated position data.

10. The method of claim 7, wherein the seismic data are expressed in a time-offset domain and the model is expressed in a tau-p domain.

11. The method of claim 2, wherein the source data vary by take-off angle.

12. The method of claim 7, wherein the emulated-source data are defined by point source elements.

13. The method of claim 7, further including:
receiving respective source data for each of a plurality of sources, and
the transform operator is determined using the respective source data, the position data, and the selected domain-transform operator.

14. The method of claim 13, further including:
receiving emulated position data different from the position data;
determining a second transform operator using the emulated-source data, the emulated position data, and the domain-transform operator; and
applying the determined second transform operator to the determined model to provide second output seismic data corresponding to the received emulated position data.

15. The method of claim 7, wherein the determining of the model further comprises applying the transform operator and an adjoint operator to the source data to derive a deblended model m of a multi-source seismic data using conjugate gradients.

16. The method of claim 2, wherein the receiving of the source data comprises receiving a receiver gather from a continuous marine source.

17. The method of claim 2, wherein the seismic data and the source data is recorded together as a function of recording time in one or more files.

18. A seismic data processing system comprising:
at least one processor configured to:
receive seismic data associated with waves emitted by one or more non-impulsive marine sources that move continuously while emitting the waves, and carrying information about a subsurface formation;
receive a source emission function associated with each of the non-impulsive marine sources;
receive at least one receiver response function;
derive a mathematical model of the seismic data, which model describes a wavefield variation with source and receiver position, using at least one of the following corrections:
receiver motion correction;
source motion correction;
receiver response correction; and/or
source emission correction; and
use the model to output data extracted from the seismic data and representative of stationary source and receiver data,
wherein the output data is used to image the subsurface formation.

19. The system of claim 18, wherein the at least one processor is configured to perform both the source motion correction and the receiver motion correction.

20. The system of claim 18, wherein the source motion correction and the receiver motion correction are performed jointly.

21. The system of claim 19, wherein the source motion correction and the receiver motion correction are performed sequentially.

\* \* \* \* \*

UNITED STATES PATENT AND TRADEMARK OFFICE
CERTIFICATE OF CORRECTION

PATENT NO. : 10,288,753 B2
APPLICATION NO. : 14/902619
DATED : May 14, 2019
INVENTOR(S) : Gordon Poole and Robert Dowle It is certified that error appears in the above-identified patent and that said Letters Patent is hereby corrected as shown below:

In the Specification

In Column 12, Line 30, delete "vibroseis on non-synchronized" and insert --vibroseis or non-synchronized--, therefor Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*